United States Patent
Ueda et al.

(10) Patent No.: US 7,801,574 B2
(45) Date of Patent: Sep. 21, 2010

(54) WIRELESS COMMUNICATION APPARATUS, WIRELESS NETWORK SYSTEM, COMMUNICATION METHOD AND PROGRAM

(75) Inventors: Satoshi Ueda, Tokyo (JP); Satoru Ooshima, Tokyo (JP)

(73) Assignee: Sony Corporation, Tokyo (JP)

(*) Notice: Subject to any disclaimer, the term of this patent is extended or adjusted under 35 U.S.C. 154(b) by 1189 days.

(21) Appl. No.: 11/406,411

(22) Filed: Apr. 19, 2006

(65) Prior Publication Data

US 2006/0270437 A1    Nov. 30, 2006

(30) Foreign Application Priority Data

Apr. 20, 2005  (JP) .......................... P2005-122434

(51) Int. Cl.
*H04B 1/00* (2006.01)

(52) U.S. Cl. .................. 455/574; 455/518; 455/519; 455/432.3; 370/338; 370/389

(58) Field of Classification Search ................ 455/574, 455/518–519, 432.3; 370/338, 389
See application file for complete search history.

(56) References Cited

U.S. PATENT DOCUMENTS

2006/0193315 A1* 8/2006 Sinivaara et al. ............ 370/389

FOREIGN PATENT DOCUMENTS

| JP | 2005-027248 | 1/2004 |
| JP | 2004-312691 | 11/2004 |
| JP | 2005-057601 | 3/2005 |

OTHER PUBLICATIONS

IEEE Std. 802.11-1997, Part 11: Wireless LAN Medium Access Control (MAC) and Physical Layer (PHY) specifications.*

* cited by examiner

*Primary Examiner*—Lester Kincaid
*Assistant Examiner*—Charles Shedrick
(74) *Attorney, Agent, or Firm*—Rader, Fishman & Grauer PLLC

(57) ABSTRACT

There is provided a wireless communication apparatus configured to perform wireless communications with a counterpart apparatus by use of a data frame including a data transmission indication period and a data transmission period following the indication period. In the apparatus a normal power state and a low power consumption state are set as the operating states, and a normal power mode and a low power consumption mode are set as the power management modes. Further, in the normal power mode, the wireless communication apparatus is operated in the normal power state; and in the low power consumption mode, the wireless communication apparatus is operated in the normal power state during the data transmission indication period and in the low power consumption state during the data transmission period.

27 Claims, 14 Drawing Sheets

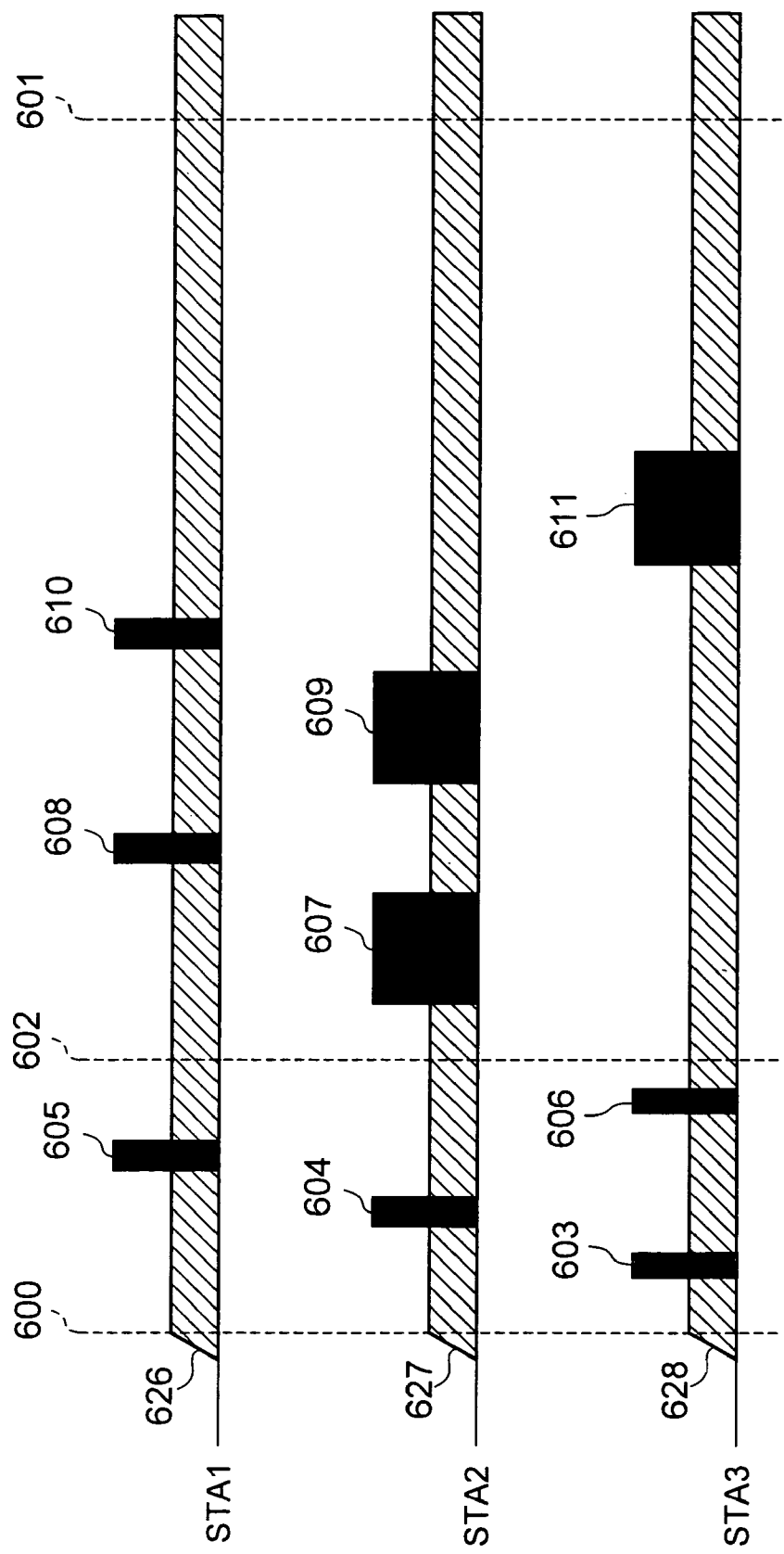

WIRELESS COMMUNICATION APPARATUS, WIRELESS NETWORK SYSTEM, COMMUNICATION METHOD AND PROGRAM

BACKGROUND OF THE INVENTION

1. Field of the Invention

The present invention relates to a wireless communication apparatus, a wireless network system, a communication method and a program for communication between communication apparatuses in a wireless LAN system, etc.

2. Description of Related Art

In recent years, the WLAN network defined by IEEE 802.11 standard has expanded its market and usage (see Japanese Patent Application Publication Nos. 2004-312691, 2005-57601 and 2004-27248). In the past, an infrastructure network was built around a central control terminal, which is referred to as an access point. In recent years, however, it is more popular to use an ad hoc network, in which no access point exist and wireless terminals communicate with each other on an equal basis.

The ad hoc network is often formed with battery-driven apparatuses that serve as wireless terminals or nodes, and thus low power consumption or high power efficiency is strongly desirable. The IEEE 802.11 standard defines operations in the low power consumption state in the ad hoc network as follows in "11.2.2 Power management in an IBSS."

Wireless terminals are classified into PS mode wireless terminals operating in a power saving (Power Save: PS) mode or a low consumption operation mode and Active mode wireless terminals operating in an Active mode. Each Target Beacon Transmission Time (TBTT) interval is divided into an Announcement Traffic Indication Message (ATIM) window of traffic generation and a time period following the ATIM window.

In a case where a destination of a unicast transmission frame is a PS mode wireless terminal, the wireless terminal once buffers the frame, transmits an ATIM frame to the PS mode wireless terminal in an ATIM window, and notifies the PS mode wireless terminal that the wireless terminal is buffering the frame. In a case where the PS mode wireless terminal is included in destination terminals to which the transmission frame is transmitted by way of broadcasting and multicasting, the wireless terminal once buffers the frame, transmits an ATIM frame by way of broadcasting or multicasting through an ATIM window, and notifies the PS mode wireless terminal that the wireless terminal is buffering the frame.

In the ATIM window the PS mode wireless terminal is in the Awake state and ready to receive the frame. Upon receiving a unicast ATIM frame destined for itself in an ATIM window, the PS mode wireless terminal sends a response frame to the sender and maintains the Awake state until the next TBTT. Further, the Awake state is also maintained until the next TBTT in the case of receiving the ATIM frame of the broadcast and related multicasting. After the ATIM window is ended, the PS mode terminal, which does not receive the related ATIM, frame shifts to an Doze state until the next TBTT. The wireless terminal which transmits the ATIM frame by way of broadcasting and multicasting and the wireless terminal which transmits the unicast ATIM frame, which receives the returned response frame, respectively transmit the buffered frames to the intended addresses during a time period between the ending of the ATIM window and the next TBTT.

Further, during each TBTT, all the wireless terminals that connected to the ad hoc network select random delay values within a predetermined range. The wireless terminal that selects the minimum delay value transmits a Beacon after the selected delay. In a case where the PS mode wireless terminal transmits the Beacon, the terminal keeps the Awake state until the next TBTT, even if no ATIM frame is transmitted or received. The Active mode wireless terminal always holds the Awake state.

As mentioned above, according to the IEEE 802.11 standard, information on whether or not there is a transmission frame is notified during the ATIM window, which exists in the head of the TBTT. Only when there is the transmission frame, the Awake state is maintained. Otherwise, the Doze state is selected, thus achieving the low power consumption operation.

SUMMARY OF THE INVENTION

Below, some issues in the ad hoc network defined by the IEEE 802.11 standard will be described.

In the IEEE 802.11 standard, a PS mode wireless terminal, which is notified that a frame destined for itself is buffered in a ATIM frame, holds the Awake state until the next TBTT regardless of the number of frames to be transmitted. For example, when the number of buffered frames is one, it is expected that frame transmission is completed in the early stage of time immediately after ending the ATIM window while the Awake state is held until the next TBTT. In other words, the Awake state is held even when there is no frame to receive, resulting in a wasting of power. The power may be wasted in a case where the time required for transmitting the buffered frame is shorter than the period between the ending of the ATIM window and the next TBTT. It is assumed that requirements defined in the IEEE 802.11 standard are provided to promote the efficiency of ATIM window. More specifically, it is expected that the efficiency will improve by receiving communications between neighboring wireless terminals and recognizing an Awake state of the target PS mode wireless terminal even without having a direct exchange of the ATIM frame. However, in practice, the efficiency may not be improved if the number of terminals participating the network is small, for example, two or less.

Further, even the PS mode wireless terminal holds the Awake state until the next TBTT when it transmits a Beacon. This operational mode is designed to prepare for an Active Scan. However, if only a Passive Scan is expected, there is no need to hold the Awake state. In this case, the PS mode wireless terminal which transmits the Beacon wastes its power by holding the Awake state from the ending of the ATIM window to the next TBTT.

The present invention provides a wireless communication apparatus, a wireless network system, a communication method, and a program, which are capable of reducing wasted power consumption.

According to a first aspect of the present invention, there is provided a wireless communication apparatus configured to perform wireless communications with a counterpart apparatus by use of a data frame. The data frame includes a data transmission indication period and a data transmission period following the indication period. The apparatus includes a processing unit configured to perform power management of the wireless communication apparatus and an operation switching function for switching between operating states of the wireless communication apparatus. A normal power state and a low power consumption state are set as the operating states. A normal power mode and a low power consumption mode are set as power management modes. The processing unit performs, the power management such that the wireless communication apparatus is operated in one of the following manners: (1) the normal power state in the normal power mode; (2) the normal power state during the data transmission indication period in the low power consumption mode; and (3) the low power consumption state during the data transmission period in the low power consumption mode.

According to a second aspect of the present invention, there is provided a wireless network system configured to enable wireless communications between wireless communication apparatuses by use of a data frame including a data transmission indication period and a data transmission period following the indication period. Each of the wireless communication apparatuses includes: a processing unit configured to perform power management of the wireless communication apparatus; and an operation switching function for switching between operating states of the wireless communication apparatus. A normal power state and a low power consumption state are set as the operating states. A normal power mode and a low power consumption mode are set as power management modes. The processing unit performs the power management such that the wireless communication apparatus is operated in one of the following manners: (1) the normal power state in the normal power mode; (2) the normal power state during the data transmission indication period in the low power consumption mode; and (3) the low power consumption state during the data transmission period in the low power consumption mode.

The wireless communication apparatus may further include: a frame transmission processing unit and reception processing unit. In the normal power state, the processing unit may perform power management of the transmission processing unit and the reception processing unit such that frame transmission and reception operations can be performed. In the low power consumption state, the processing unit may perform the power management of the transmission processing unit and the reception processing unit such that no frame transmission or reception operation can be performed and less power is consumed than that of the normal power state.

At the start of the data transmission indication period, the processing unit may perform the power management such that the wireless communication apparatus operates in the normal power state regardless of the power management mode and a previous operating state, and transmits a beacon according to a specified transmission procedure.

In a case where data to be transmitted to a wireless communication apparatus, which operates in the low power consumption mode, is held and there is a wireless communication apparatus which requests a transmission of the data during the data frame period, the wireless communication apparatus may function as a destination wireless terminal if the apparatus is a destination of the data and a sender wireless terminal if the apparatus is a sender of the data. The sender wireless terminal may acquire a transmission right with respect to a wireless medium before the end of the data transmission indication period after the beacon transmission, and it transmits a transmission indication frame to the destination wireless terminal.

The destination wireless terminal may send back a reception response frame to the sender wireless terminal if the destination wireless terminal received a unicast transmission indication frame among the transmission indication frames, and no reception response frame may be sent back if the destination wireless terminal received a multicast transmission indication frame.

The destination wireless terminal may hold therein a transmission indication frame sender address list, the list showing a sender address of the unicast transmission indication frame, which sends back the reception response frame, a sender address of the multicast transmission indication frame, and validities thereof. The sender wireless terminal may hold therein a transmission indication frame destination address list, the list showing a destination address of the unicast transmission indication frame, a destination address of the multicast transmission indication frame, which receives the returned transmission response frame, and validities thereof. The sender wireless terminal may be also capable of functioning as the destination wireless terminal.

In the data transmission period, the normal power state may be selected for operations of the destination wireless terminal which transmits the reception response frame to the unicast transmission indication frame, the destination wireless terminal which receives the multicast transmission indication frame, the sender wireless terminal which transmits the unicast transmission indication frame and receives the corresponding reception response frame, and the sender wireless terminal which transmits the multicast transmission indication frame. The low power consumption state may be selected for the rest of the wireless terminals.

A data frame transmitted and received between the wireless terminals may include transmission continuation information, the transmission continuation information indicating whether or not the sender wireless terminal transmits a subsequent data frame to the same destination wireless terminal during the data transmission period. The sender wireless terminal may transmit a plurality of data frames to the same destination wireless terminal during the data transmission interval such that information indicating that the subsequent data frame is transmitted is set in the transmission continuation information of the data frames among the plurality of data frames except for the last data frame to be transmitted, and information indicating that no subsequent data frame is transmitted is set in the transmission continuation information of the last data frame. The sender wireless terminal may transmit one data frame to the same destination wireless terminal during the data transmission interval, and information indicating that no subsequent data frame is transmitted is set in the transmission continuation information of the data frame.

Among the wireless terminals in the low power consumption mode, in which the transmission indication frame is transmitted and received and which operate in the normal power state for the data frame transmission and the data frame reception during the data transmission indication period, and in a case where the wireless terminal functions as the sender wireless terminal, and further the wireless terminal transmits a unicast data frame in which information indicating that no subsequent data frame is transmitted is set in the transmission continuation information to a valid destination address in the transmission indication frame destination address list, receives a corresponding transmission response frame, and transmits a multicast data frame, the destination address included in the transmission indication frame destination address list may be invalidated. If all the destination addresses are invalidated, the conditions for completing transmission are considered to be satisfied. The wireless terminal may operate in the low power consumption state until the start of the next data transmission indication period. In a case where the wireless terminals function as the destination wireless terminal, and the unicast data frame is received, in which information indicating that no subsequent data frame is transmitted is set in the transmission continuation information, from a valid sender address listed in the transmission indication frame sender address list, a corresponding transmission response frame is transmitted, and the multicast data frame is received, the sender address included in the transmission indication frame sender address list may be invalidated. If all the sender addresses are invalidated, the conditions for completing reception are considered as satisfied. The wireless terminal may operate in the low power consumption state until the start of the next data transmission indication period.

In a case where the wireless communication apparatus functions as both the sender wireless terminal and the destination wireless terminal, the wireless communication apparatus may operate in the low power consumption state until the start of the next data transmission indication period if the conditions for completing transmission and the conditions for completing reception are satisfied.

The multicast may be performed in a case of sending to all the wireless communication apparatuses in the wireless network and a case of sending to selected wireless communication apparatuses in the wireless network.

According to a third aspect of the present invention, there is provided a communication method for a wireless communication apparatus configured to perform wireless communications with a counterpart apparatus by use of a data frame including a data transmission indication period and a data transmission period following the indication period. The method includes: setting a normal power state and a low power consumption state as operating states; setting a normal power mode and a low power consumption mode as power management modes; at the normal power mode, operating the wireless communication apparatus in a normal power state; and at the low power consumption mode, operating the wireless communication apparatus in the normal power state during the data transmission indication period, and operating in the low power consumption state during the data transmission period.

According to a fourth aspect of the present invention, there is provided computer-readable media tangibly embodying a program of instructions executable by a computer to perform a communication method for a wireless communication apparatus configured to perform wireless communications with a counterpart apparatus by use of a data frame including a data transmission indication period and a data transmission period following the indication period. The method includes: setting a normal power state and a low power consumption state as operating states; setting a normal power mode and a low power consumption mode as power management modes; at the normal power mode, operating the wireless communication apparatus in a normal power state; and at the low power consumption mode, operating the wireless communication apparatus in the normal power state during the data transmission indication period, and operating in the low power consumption state during the data transmission period.

According to embodiments of the present invention, the wireless communication apparatus operates in the normal power state at the time of the normal power mode. When operating in the low power consumption mode, the wireless communication apparatus operates in the normal power state during the data transmission indication period included in the data frame and operates in the low power consumption state during the data transmission period if operating in the low power consumption mode, Accordingly, it is possible to avoid wasting power.

BRIEF DESCRIPTION OF THE DRAWINGS

FIG. 15 is a chart showing the frame transmission in the ad hoc network operating in the normal power management mode in the same state as FIG. 14 and changes of the power state;

DETAILED DESCRIPTION OF EMBODIMENTS

Figure 1:
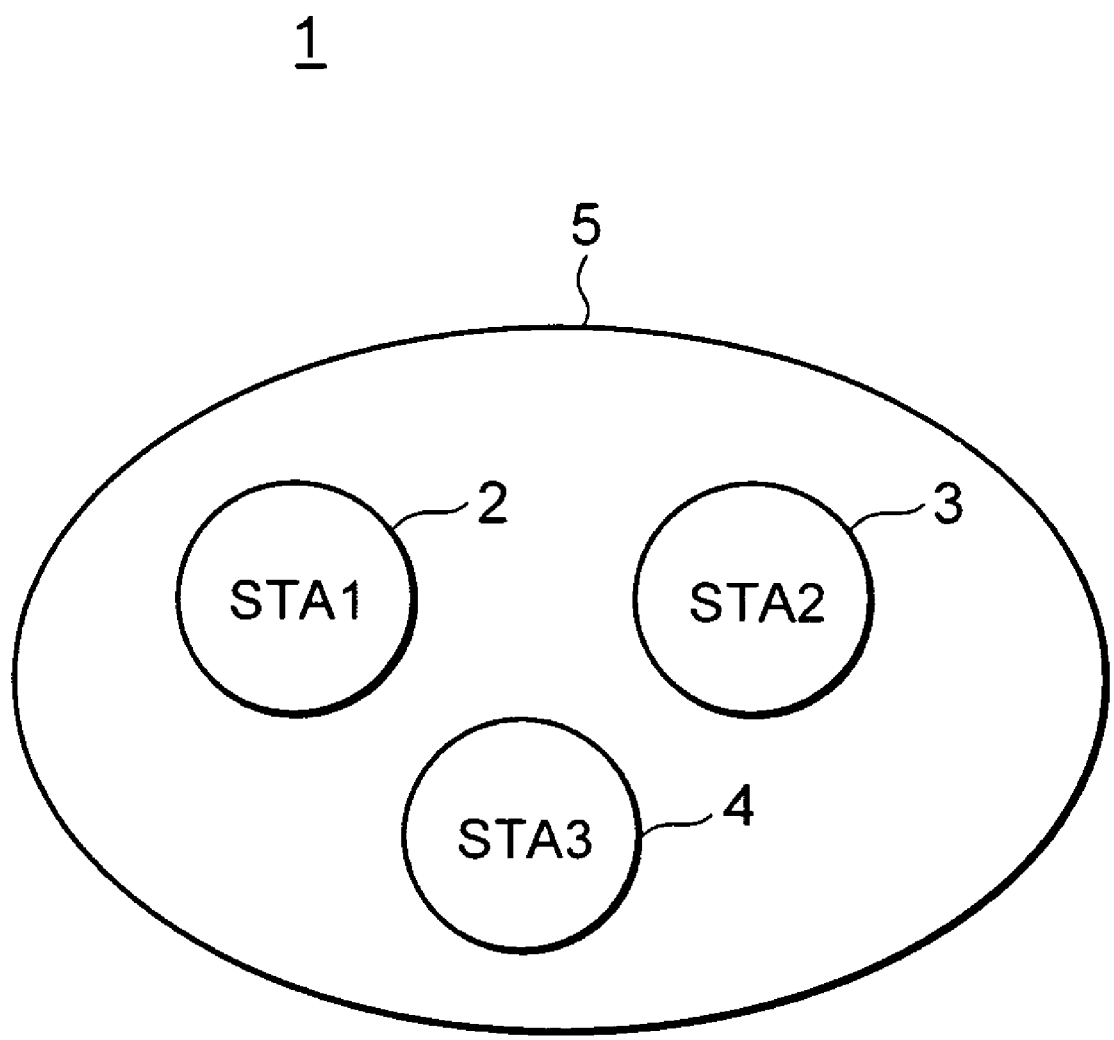
FIG. 1 is a block diagram showing an example of a structure of a wireless network system in accordance with a present embodiment.

Hereafter, embodiments of the present invention will be described with reference to the drawings. FIG. 1 is a block diagram showing an example of a structure of a wireless network system in accordance with one embodiment.

A wireless network of the present embodiment is formed with a plurality of wireless-communications terminals (three in the example of FIG. 1). The wireless network system 1 of FIG. 1 forms an ad hoc network 5 with the wireless terminals or stations 2 (STA1), 3 (STA2), and 4 (STA3) as three sets of wireless communication apparatuses, and the wireless terminals 2-4 perform wireless communications through a wireless channel.

Figure 2:
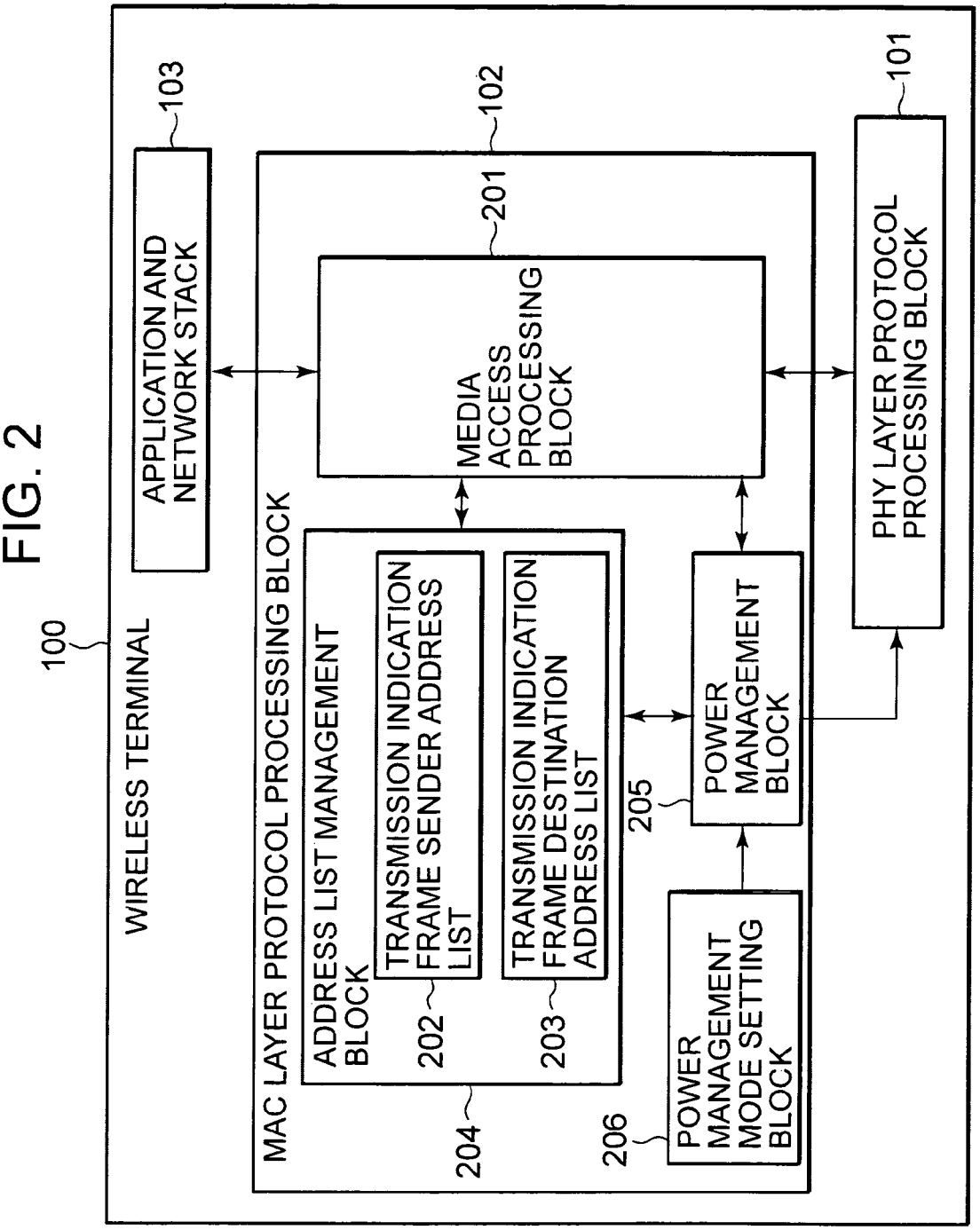
FIG. 2 is a block diagram showing a particular example of a structure of a wireless terminal which forms the wireless network of FIG. 1.

FIG. 2 is a block diagram showing a particular example of a structure of the wireless terminal which forms the wireless network of FIG. 1. In addition, since it has like structure and function as those of the wireless terminals 2-4, it is indicated by reference numeral 100 in FIG. 2.

As shown in FIG. 2, the wireless terminal 100 has a PHY layer protocol processing block 101 which performs PHY layer protocol processing, a MAC layer protocol processing block 102 which performs MAC layer protocol processing, and an application and network stack 103 which perform processing of application and network stack. In addition, in the present embodiment, the PHY layer protocol processing block 101 functions as a transmission processing unit and a reception processing unit for a data frame, for example.

Next, an internal structure of the MAC layer protocol processing block 102 of the wireless terminal 100 will be described. The MAC layer protocol processing block 102 has a media access processing block 201, an address list management block 204 including a transmission indication frame sender address list 202 and a transmission indication frame destination address list 203, a power management block 205, and a power management mode setting block 206.

The media access processing block 201 performs media access processing in compliance with a wireless-communications standard represented by the IEEE 802.11 standard and includes a transmission/reception processing of an application frame and a management/control frame. A content of the transmission indication frame is sent to the address list management block 204 at the time of transmitting and receiving the transmission indication frame. In the address list management block 204, contents of the transmission indication frame sender address list 202 and the transmission indication frame destination address list 203 are updated based on the content of the transmission indication frame.

The power management block 205 realizes an independent power management mode which will be described in the present embodiment and a normal power management mode defined by the IEEE 802.11 standard. The power management mode to be used is provided by the power management mode setting block 206. The power management block 205 at the time of independent power management mode acquires states of the transmission indication frame sender address list 202 from the address list management block 204 and the transmission indication frame destination address list 203 from the address list management block 204, and operates based on the data. The power management block 205 performs power management on the media access processing block 201, the address list management block 204, and the PHY layer protocol processing block 101.

Figure 3:
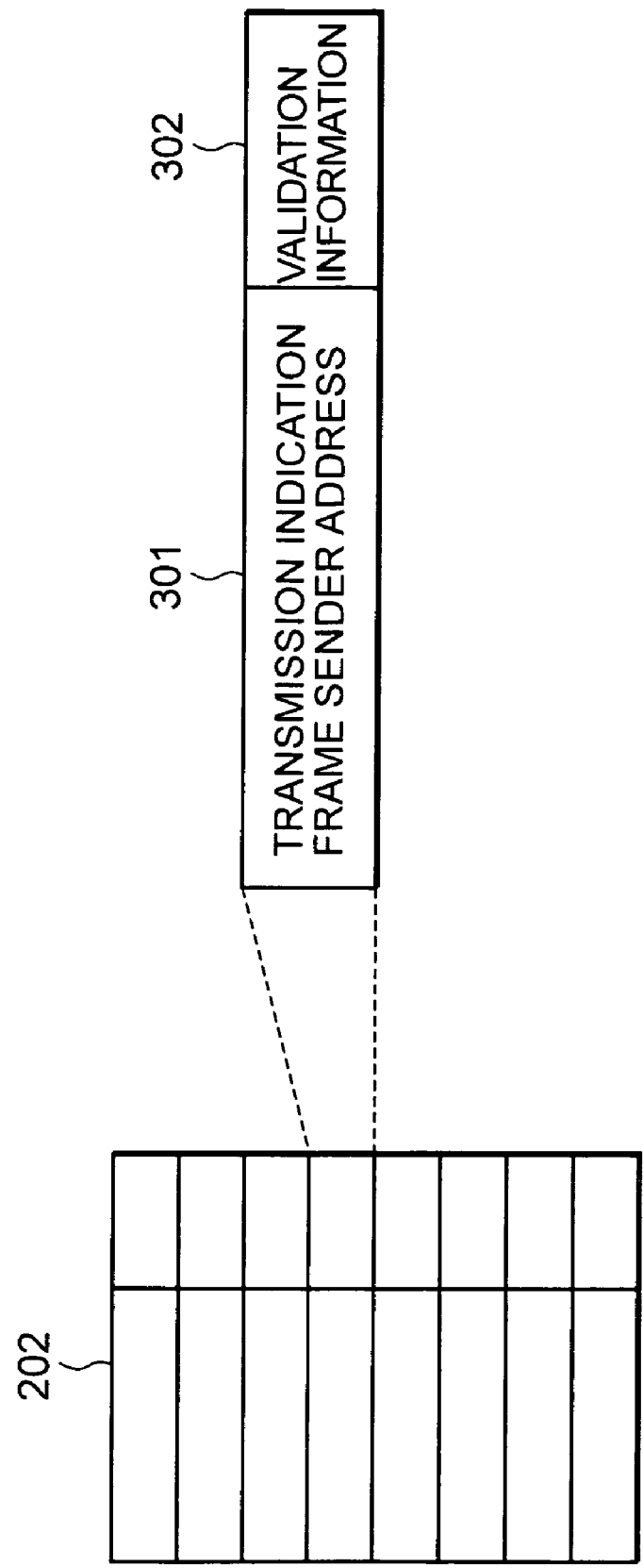
FIG. 3 is a chart showing an example of a package of a transmission indication frame sender address list.

FIG. 3 is a chart showing an example of a package of a transmission indication frame sender address list. The transmission indication frame sender address list 202 includes a plurality of elements. As shown in FIG. 3, each element is formed with a transmission indication frame sender address 301 and corresponding validation information 302.

Figure 4:
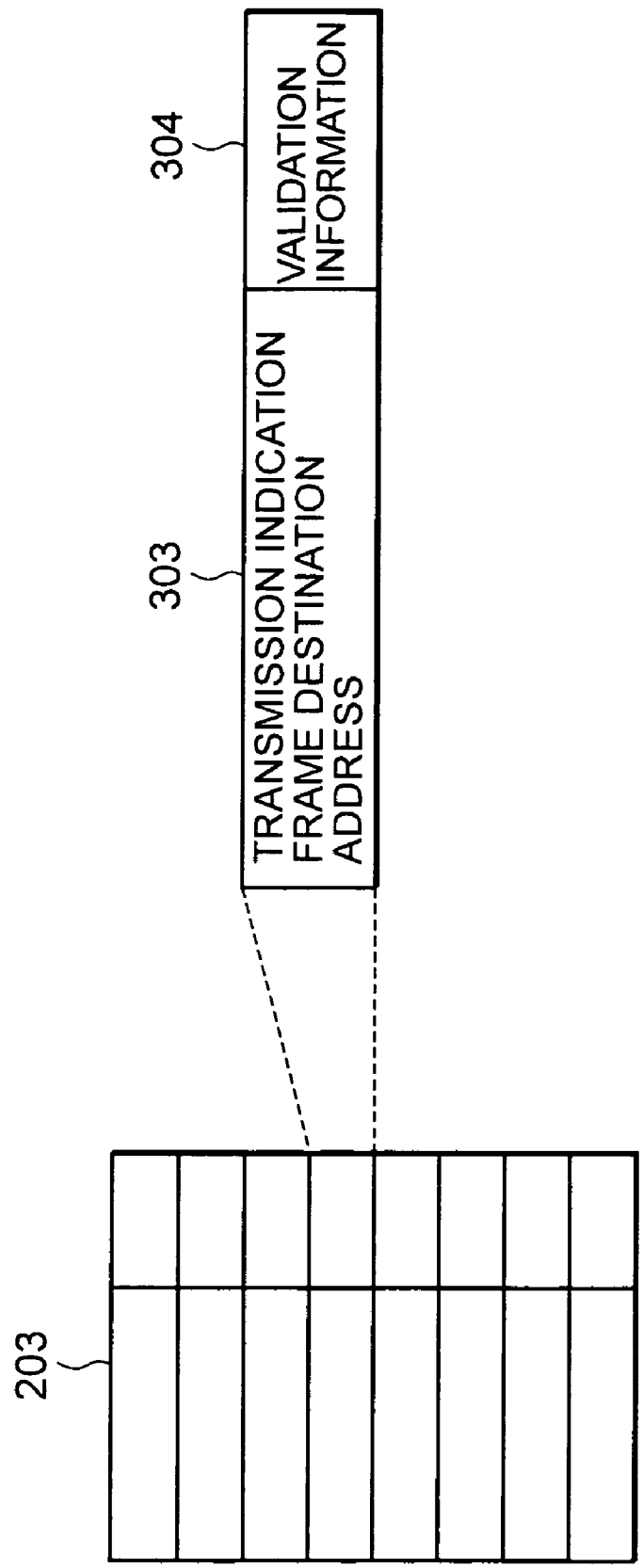
FIG. 4 is a chart showing an example of a package of a transmission indication frame destination address list.

FIG. 4 is a chart showing an example of a package of a transmission indication frame destination address list. The transmission indication frame destination address list 203 includes a plurality of elements. As shown in FIG. 4, each element is formed with a transmission indication frame destination address 303 and a corresponding validation information 304.

Hereafter, operation in a case where the wireless terminal connected to the ad hoc network selects an independent power management mode will be described.

Figure 5:
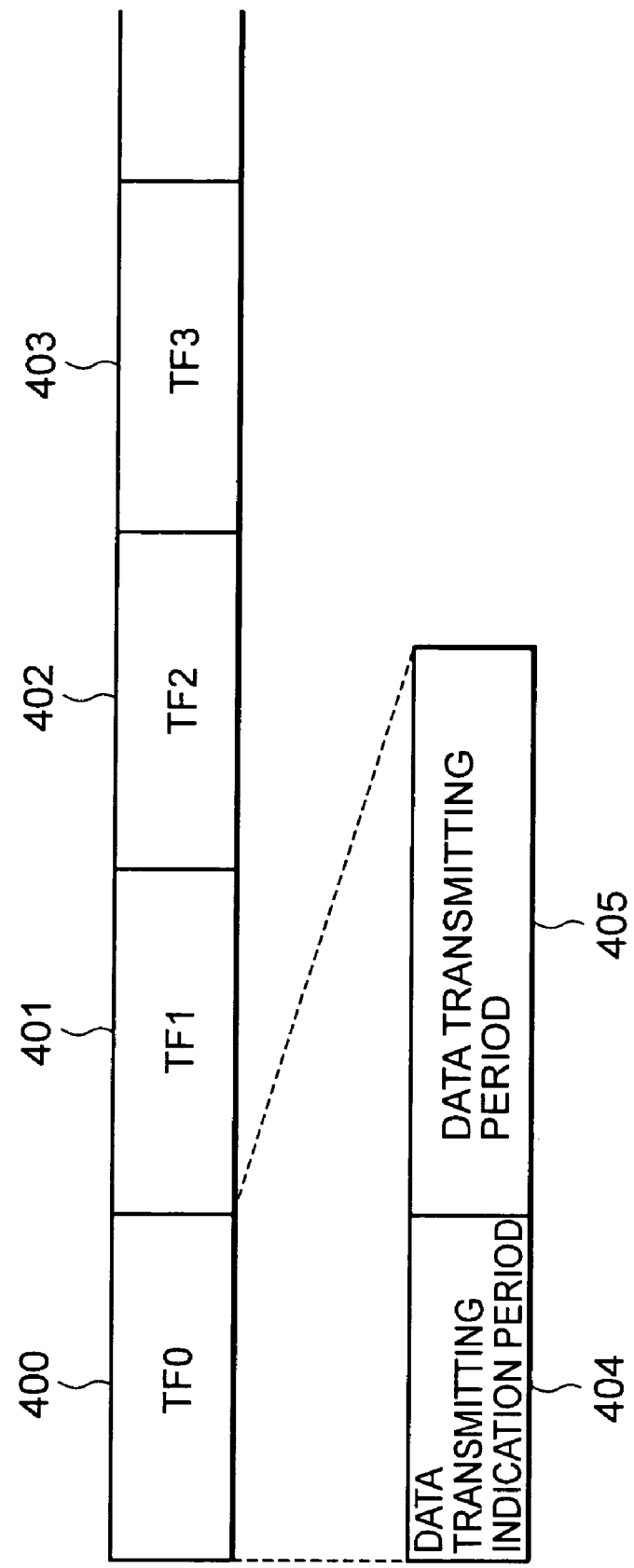
FIG. 5 is a chart for explaining a time structure of an ad hoc network.

FIG. 5 is a chart for explaining a time structure of the ad hoc network. As shown in FIG. 5, the network time structure is divided into time frames TF having regular time intervals. In the figure, the time frames TF are illustrated as a time frame (TF0) 400, a time frame (TF1) 401, a time frame (TF2) 402, and a time frame (TF3) 403. Furthermore, each of the time frames TF (0-3, . . . ) is formed with a data transmission indication period 404 and a data transmission period 405.

The power state of the wireless terminal performing the independent power management mode will be described. The wireless terminal 100 has a normal power state and a low power consumption state as an power state. The normal power state is a state where the normal power is supplied and a frame can be transmitted and received. The low power consumption state is a state where the frame cannot be transmitted or received, but the power consumption is less than that in the normal power state. The wireless terminal 100 in the independent power management mode always operates in the normal power state during the data transmission indication period 404. On the other hand, during the data transmission period, the wireless terminal 100 operates in the normal power state only when a valid element is included in the transmission indication frame sender address list 202 and the transmission indication frame destination address list 203, otherwise, it operates in the low power consumption state.

In the normal power state, the power management block 205 in the wireless terminal 100 performs power management so that drive power is supplied to the media access processing block 201, the address list management block 204, and the PHY layer protocol processing block 101, for example. On the other hand, in the low power consumption state, the power management block 205 performs power management in such a way that the drive power is not supplied to the media access processing block 201, the address list management block 204, or the PHY layer protocol processing block 101.

In order to validate the element of the transmission indication frame sender address list 202 and the transmission indication frame destination address list 203, it is necessary to exchange transmission indication frames during the data transmission indication period 404. In a case where the transmission indication frame is transmitted by way of unicast, upon receiving a corresponding reception response frame, the wireless terminal 100 creates an element for a destination address of the transmission indication frame if there is no element and validates the validation information 304. In a case where the transmission indication frame is transmitted by way of broadcasting or multicasting, when the transmission is completed, an element for the destination addresses of the transmission indication frame is created if there is no element, and the validation information 304 are validated.

In a case where the transmission indication frame is received by way of unicast, transmitting a corresponding reception response frame, the wireless terminal 100 creates an element for a sender address of the transmission indication frame if there is no element and validates the validation information 302. In a case where it receives the transmission indication frame by way of broadcasting or multicasting, if it is included in the destination, and when the reception is completed, it creates an element for the sender address of the transmission indication frame if there is no element and validates the validation information 302.

In other words, in a case where the data frame is transmitted to the wireless terminal 100 which operates in the independent power management mode, it is necessary to exchange the transmission indication frames during the data transmission indication period 404, and it is necessary to validate the element with respect to the transmitter's address in the transmission indication frame sender address list 202 of the destination wireless terminal.

A structure, which invalidates the validated element, will be described below. Firstly, transmission continuation information is added to the data frame. For this purpose, a More Data Field (MDF) of Frame Control Field of a MAC header area in a MAC frame defined by the IEEE 802.11 standard is used.

Figure 6:
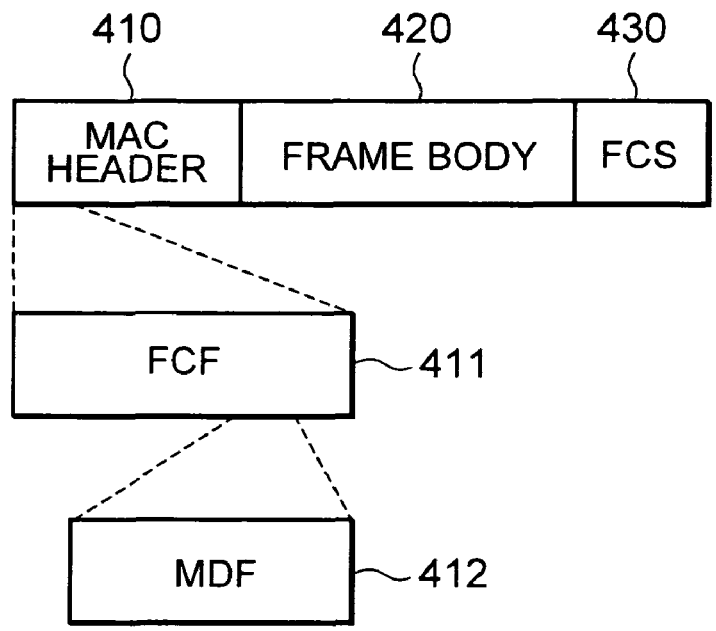
FIG. 6 is a chart showing a relationship between a structure of a data type frame and a more data field (More Data Field: MDF) which are used for application data transmission in the IEEE 802.11 standard.

FIG. 6 is a chart showing a relationship between a structure of a data type frame and the MDF, which are used for application data transmission in the IEEE 802.11 standard.

As shown in FIG. 6, the data type frame is arranged to include a MAC header (Header) 410, a frame body (Frame Body) 420, and an FCS 430. The MAC header 410 includes a Frame Control Field (FCF) 411, and the MDF 412 is included in this frame control field 411.

In a case where the frame in which the MDF 412 is set to 0 with respect to a valid multicast or broadcast address among the elements listed in the transmission indication frame destination address list 203 is transmitted, the wireless terminal 100 invalidates the element.

Further, in a case where the frame in which the MDF 412 is set to 0 with respect to a valid unicast address among the elements listed in the transmission indication frame destination address list 203 is transmitted, and when a corresponding reception response frame is received, the element is invalidated.

In a case where the frame in which the MDF 412 is set to 0 by means of a valid multicast or broadcast address among the elements listed in the transmission indication frame sender address list 202 is received, the wireless terminal 100 invalidates the element. Further, in a case where the frame in which the MDF 412 is set to 0 by means of a valid unicast address among the elements listed in the transmission indication frame sender address list 202 is received, and when a corresponding reception response frame is transmitted, the element is invalidated. Further, when an arbitrary data transmission period ends, all valid elements are invalidated.

The wireless terminal connected to the wireless network randomly selects a delay time for beacon transmission at the start of the time frame TF. Then, a beacon is transmitted in compliance with the IEEE 802.11 standard. The IEEE 802.11 standard defines a start time of each of the time frames (400, 401, 402, 403, . . . ) as TBTT, the data transmission indication period (404) as an ATIM window, the normal power state as an Awake state, a low power consumption state as a Doze state, a data transmission indication frame as the ATIM frame, and the reception response frame as an ACK frame which is a reception acknowledge frame.

In the wireless network system in the present embodiment, which has the above structure, a sender wireless terminal and the destination wireless terminal are understood as follows. Each wireless terminal at the time of unicast-multicast transmission basically has the following functions including the functions as already described.

In a case where there is a wireless terminal 100 which holds data to be transmitted to the wireless terminal 100 operating in the low power consumption mode and wishes to transmit the data during the time frame period, the wireless terminal that is to be a data destination is regarded as the destination wireless terminal, and the wireless terminal that is to be a data transmitter is regarded as the sender wireless terminal. This sender wireless terminal acquires transmission rights with respect to a wireless medium by the time the data transmission indication period 404 ends after the beacon transmission, and it transmits the transmission indication frame to the destination wireless terminal.

The destination wireless terminal which receives the unicast transmission indication frame among the transmission indication frames sends back the reception response frame to the sender wireless terminal, while the destination wireless terminal which receives the multicast transmission indication frame does not send back the reception response frame. The destination wireless terminal holds therein the sender address of the unicast transmission indication frame which sends back the reception response frame, the sender address of the multicast transmission indication frame, and the transmission indication frame sender address list 202 which is a list showing their validities.

The sender wireless terminal holds therein the destination address of the unicast transmission indication frame which receives the transmission response frame, the destination address of the multicast transmission indication frame, and the transmission indication frame destination address list 203 which is a list showing their validities. The wireless terminal can be both the sender wireless terminal and the destination wireless terminal. According to this, in the present embodiment, as described above, each wireless terminal 100 is provided with both the transmission indication frame sender address list 202 and the transmission indication frame destination address list 203.

During the data transmission period 405, only the destination wireless terminal which transmits the reception response frame to the unicast transmission indication frame, the destination wireless terminal which receives the multicast transmission indication frame, the sender wireless terminal which transmits the unicast transmission indication frame and receives the corresponding reception response frame, the sender wireless terminal which transmits the multicast transmission indication frame, and the wireless terminal in the normal power mode operate in the normal power state. The rest of the wireless terminals operate in the low power consumption state.

The data frames transmitted and received between wireless terminals include the transmission continuation information indicating whether or not the sender wireless terminal transmits a subsequent data frame to the destination wireless terminal, which is the same as the destination of the data frame, during the data transmission period. In a case where the sender wireless terminal transmits a plurality of data frames to the same destination wireless terminal during the data transmission interval, information indicating that the subsequent data frame is transmitted is added (recorded) to the transmission continuation information of the data frames among the data frames for the destination wireless terminal are transmitted, except for the data frame transmitted last, and then the data frames are transmitted; and information indicating that no subsequent data frame is transmitted is set in the transmission continuation information of the last data frame, which is then transmitted.

On the other hand, when the sender wireless terminal transmits one data frame to the same destination wireless terminal during the data transmission interval, information indicating that no subsequent data frame is transmitted is set in the transmission continuation information of the data frame with respect to the destination wireless terminal, and then the data frame is transmitted.

Amongst the wireless terminals in the low power consumption mode in which the transmission indication frame is transmitted and received and which operate in the normal power state for data frame transmission and data frame reception during the data transmission indication period 404, when the sender wireless terminal transmits the unicast data frame in which information indicating that no subsequent data frame is transmitted is set in the transmission continuation information to a valid destination address in the transmission indication frame destination address list 203, receives a corresponding transmission response frame, and transmits a multicast data frame, it invalidates the destination address included in the transmission indication frame destination address list 203, and all the destination addresses are invalidated, the conditions for completing transmission are satisfied, and it operates in the low power consumption state until the start of the next data transmission indication period 404.

Similarly, when the destination wireless terminal receives the unicast data frame in which the information indicating that no subsequent data frame is transmitted is set in the transmission continuation information, from the valid sender address listed in the transmission indication frame sender address list 202, transmits a corresponding transmission response frame, and receives the multicast data frame, it invalidates the sender address included in the transmission indication frame sender address list 202. When all the sender addresses are invalidated, the conditions for completing reception are satisfied, and it operates in the low power consumption state until the start of the next data transmission indication period 404. When the conditions for completing transmission and the conditions for completing reception are satisfied, the wireless terminal which serves as both the sender wireless terminal and the destination wireless terminal operates in the low power consumption state until the start of the next data transmission indication period 404, Further, in the present embodiment, multicasting may be destined for all the wireless terminals in the wireless network, and alternatively it may be destined for a selected wireless terminal in the wireless network.

Hereafter, a more particular wireless communications operation in the ad hoc network formed with the wireless terminals having the function will be described.

Figure 7:
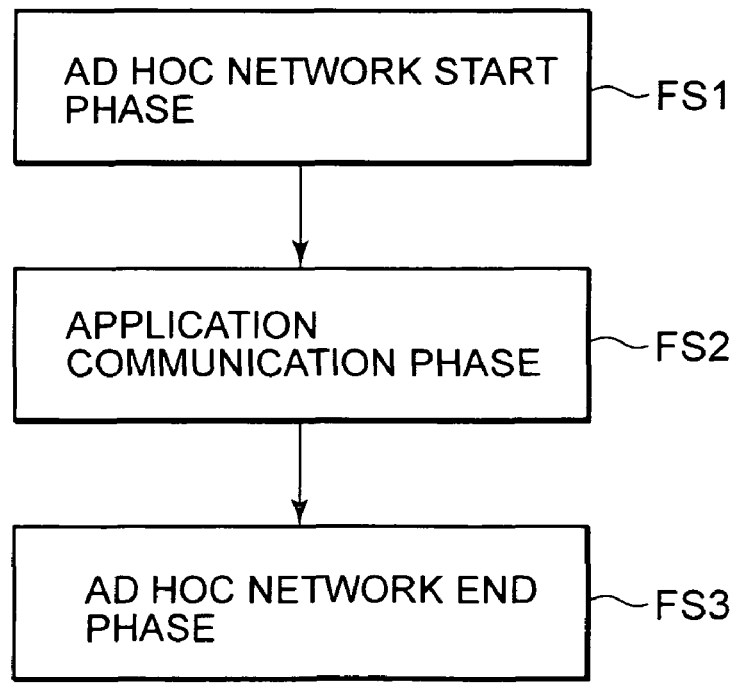
FIG. 7 is a block diagram showing phase structures when viewed on the time axis of the ad hoc network formed with wireless terminals.

FIG. 7 is a block diagram showing phase structures when viewed on the time axis of the ad hoc network formed with wireless terminals.

In FIG. 7, it is determined in an ad hoc network start phase FS1 that the wireless terminal starts ad hoc network communications, and an independent power management mode is used as the power management mode. In this example, the ad hoc network is formed with three sets of wireless terminals 2 (STA1), 3 (STA2), and 4 (STA3), and the wireless terminal 2 (STA1) serves as a network start terminal.

Figure 8:
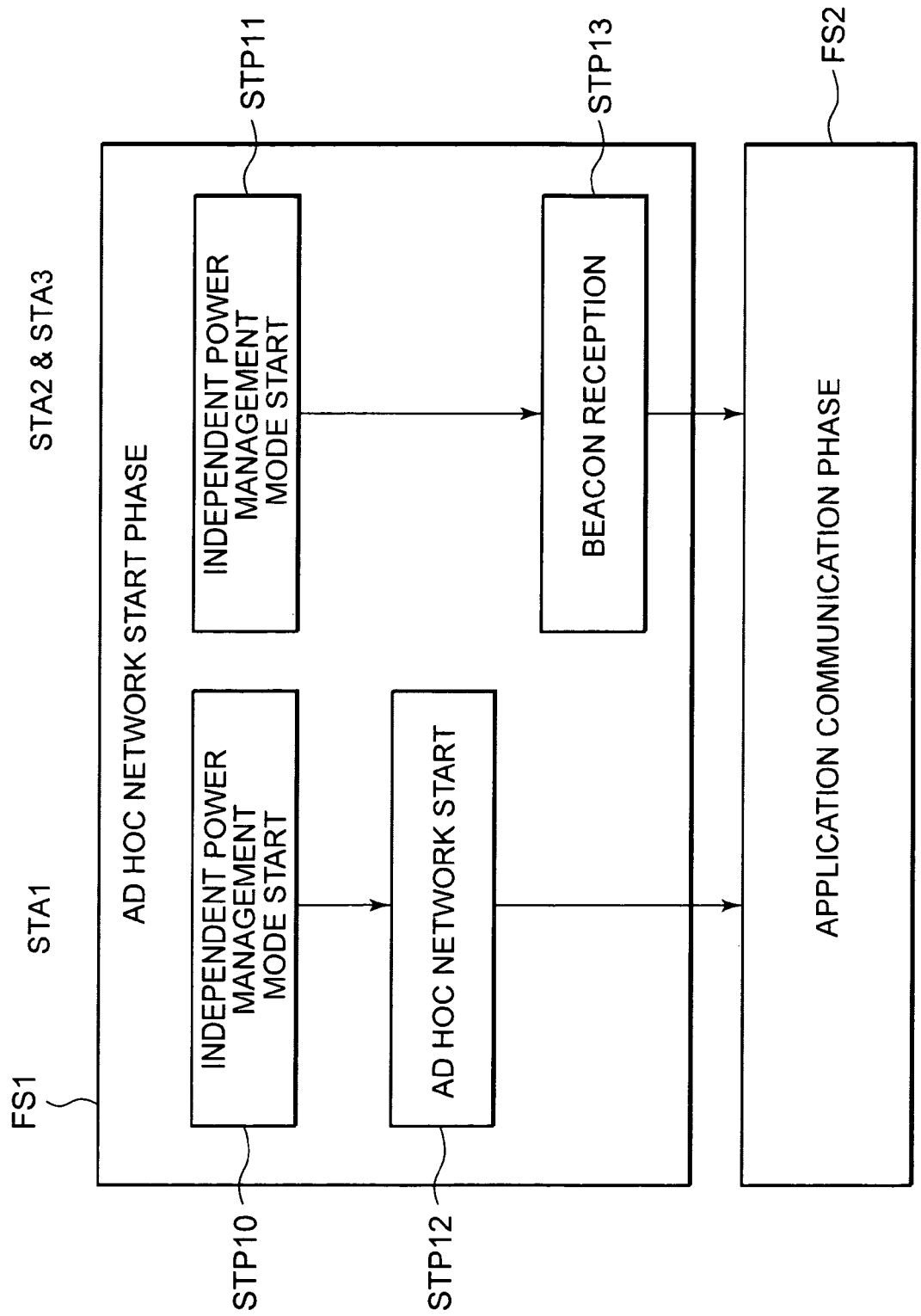
FIG. 8 is a flow chart showing steps in which each terminal selects an independent power management mode before starting the ad hoc network in an ad hoc network start phase.

FIG. 8 is a flow chart showing steps in which each terminal selects an independent power management mode before starting the ad hoc network in the ad hoc network start phase. In FIG. 8, an operation flow of the network start terminal 2 (STA1) is shown on the left side of the flow chart, and an operation flow of the wireless terminals 3 (STA2) and 4 (STA3) is shown on the right side.

Each of the wireless terminals 2-4 starts the independent power management mode in independent operation mode start steps STP10 and STP11. Then, the wireless terminal 2 (STA1) starts the ad hoc network in the ad hoc network start step STP12. The wireless terminals 3 (STA2) and 4 (STA3) receive a beacon from the ad hoc network by way of a beacon receiving step STP13, acquire a required parameter, and connect to the ad hoc network. Then, each of the wireless terminals 2-4 shifts to an application communication phase FS2.

Figure 9:
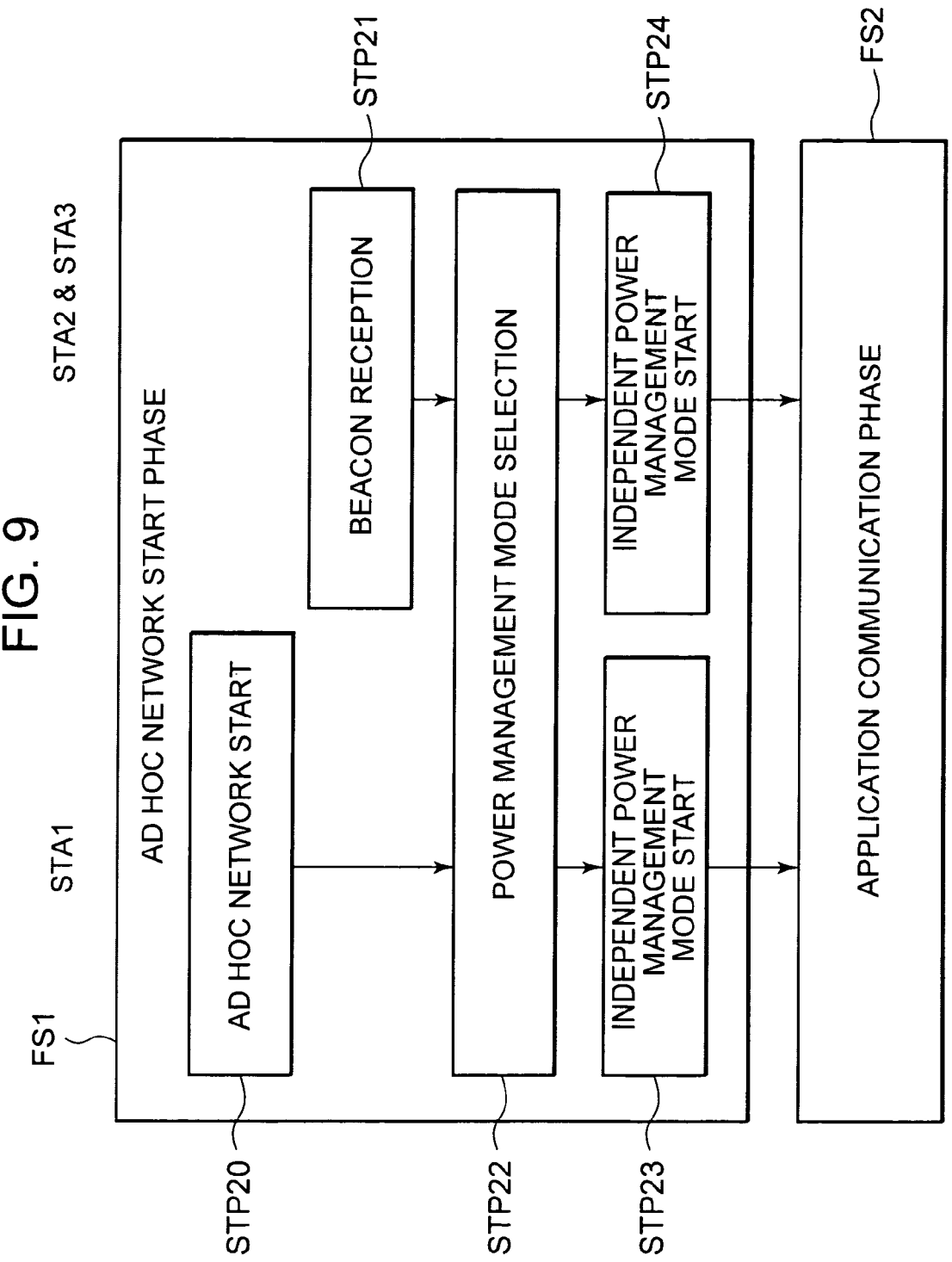
FIG. 9 is a flow chart showing steps in which each terminal selects the independent power management mode after starting the ad hoc network in the ad hoc network start phase.

FIG. 9 is a flow chart showing steps in which each terminal selects the independent power management mode after starting the ad hoc network in the ad hoc network start phase. In FIG. 9, an operation flow of the network start terminal 2 (STA1) is shown on the left side of the flow chart, and an operation flow of the wireless terminals 3 (STA2) and 4 (STA3) is shown on the right side.

Firstly, the wireless terminal 2 (STA1) starts the ad hoc network in the ad hoc network start step STP20. The wireless terminals 3 (STA2) and 4 (STA3) receive a beacon from the ad hoc network by way of a beacon receiving step STP21, acquire a required parameter, and connect to the ad hoc network. Then, the power management mode in which the data frames are exchanged and used between terminals in a power management mode selection step STP22 is determined, and an independent power management mode is started in respective power management mode start steps STP23 and STP24. After that, each wireless terminal shifts to the application communication phase FS2.

The ad hoc network start procedure, a participating procedure, a beacon transmitting procedure, and a data exchange procedure basically use the procedures specified by the IEEE 802.11 standard. In the application communication phase FS2, application data are transmitted and received between the wireless terminals 2, 3, and 4.

Hereafter, operations in a case where the application data are transmitted and received and in a case where they are not transmitted or received will be described.

Figure 10:
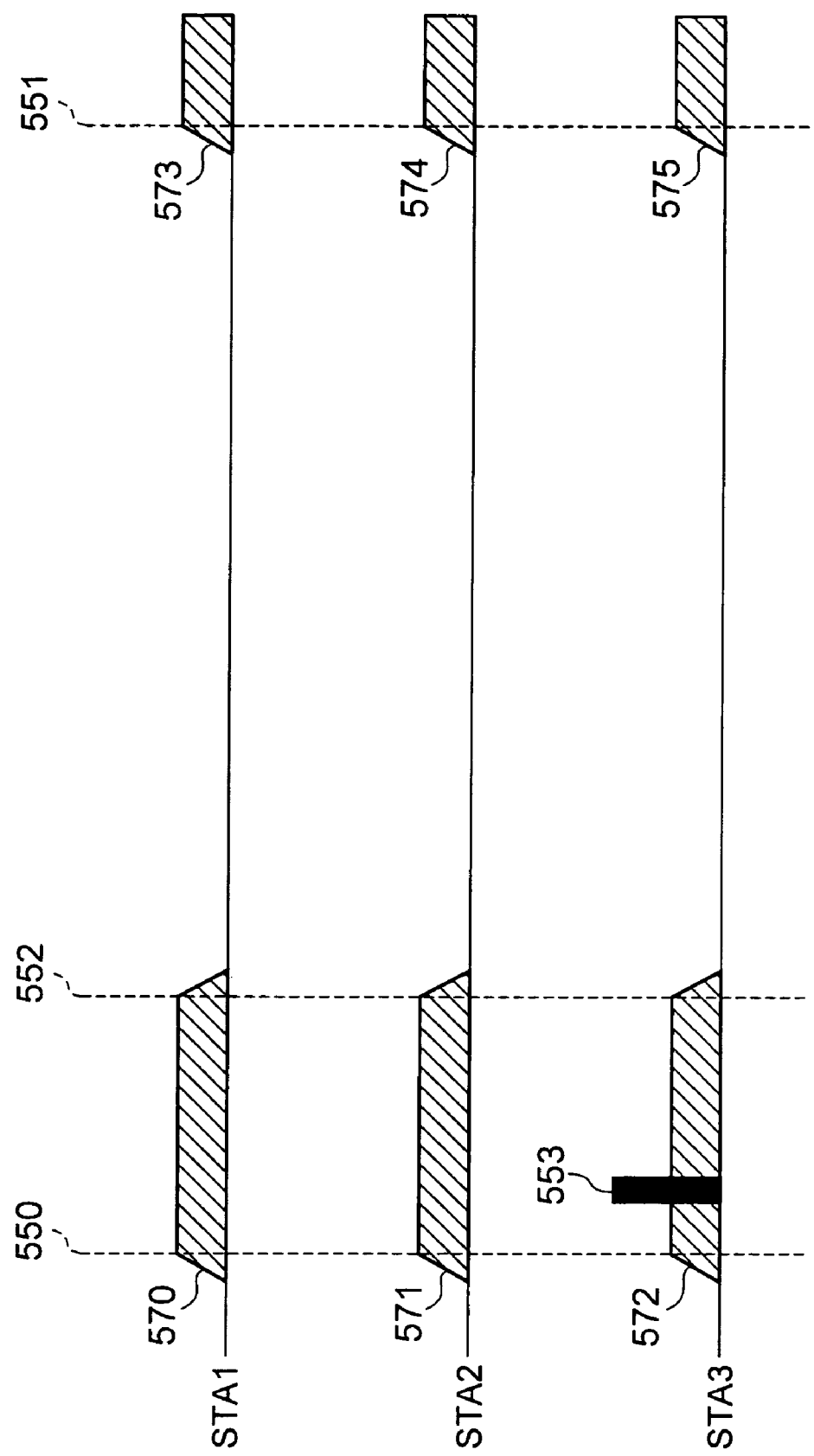
FIG. 10 is a chart showing operation of the wireless terminal in a time frame in which application data are not transmitted or received.

FIG. 10 is a chart showing the operation of the wireless terminal in the time frame in which the application data are not transmitted or received.

In FIG. 10, reference numerals 550 and 551 indicate the start of the time frame, and reference numeral 552 indicates the end of the data transmission indication period 404 in the time frame started with 550. Reference numerals 570, 571, 572, 573, 574, and 575 indicate normal power operation periods of the wireless terminals 2-4, and it is shown that the remaining portions are in the low power consumption state. An example is shown in FIG. 10, in which the wireless terminal 4 (STA3) transmits the beacon in the time frame to be started.

At the start time 550 of the time frame, all the wireless terminals 2 (STA1), 3 (STA2), and 4 (STA3) shift to the normal power state from the low power consumption state. A data transmission indication frame is not transmitted after transmitting a beacon 553 of the wireless terminal 4 (STA3) until the end 552 of the data transmission indication period 404. In this case, no wireless terminal has the transmission indication frame sender address list 202 and the transmission indication frame destination address list 203 which include a valid element, and all terminals shift to the low power consumption state after ending the data transmission indication period. Since the beacon 553 is transmitted, the ad hoc network is maintained.

Figure 11:
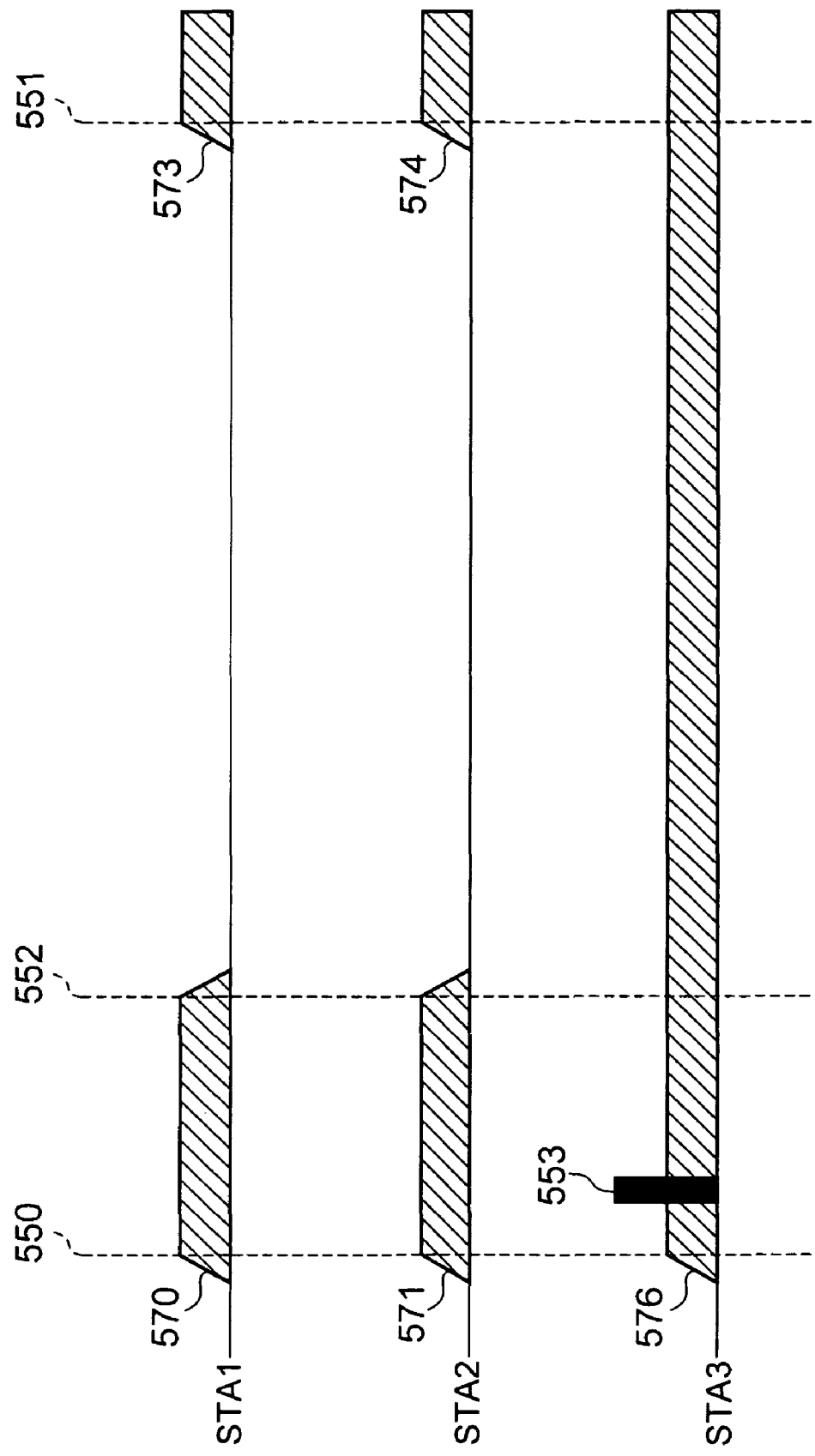
FIG. 11 is a chart showing frame transmission in the ad hoc network operating in a normal power management mode in the same state as that of FIG. 10 and changes of the power state.

FIG. 11 is a chart showing the frame transmission in the ad hoc network operating in the normal power management mode in the same state as that of FIG. 10 and changes of the power state. FIG. 11 differs from FIG. 10 only in a power state 576 of the wireless terminal 4 (STA3). Since the wireless terminal 4 (STA3) is a beacon transmitting terminal, it holds the normal power state during the time frame. As can be seen from FIGS. 10 and 11, in the independent power management mode, the power consumption is small as compared with that in the normal power management mode.

Figure 12:
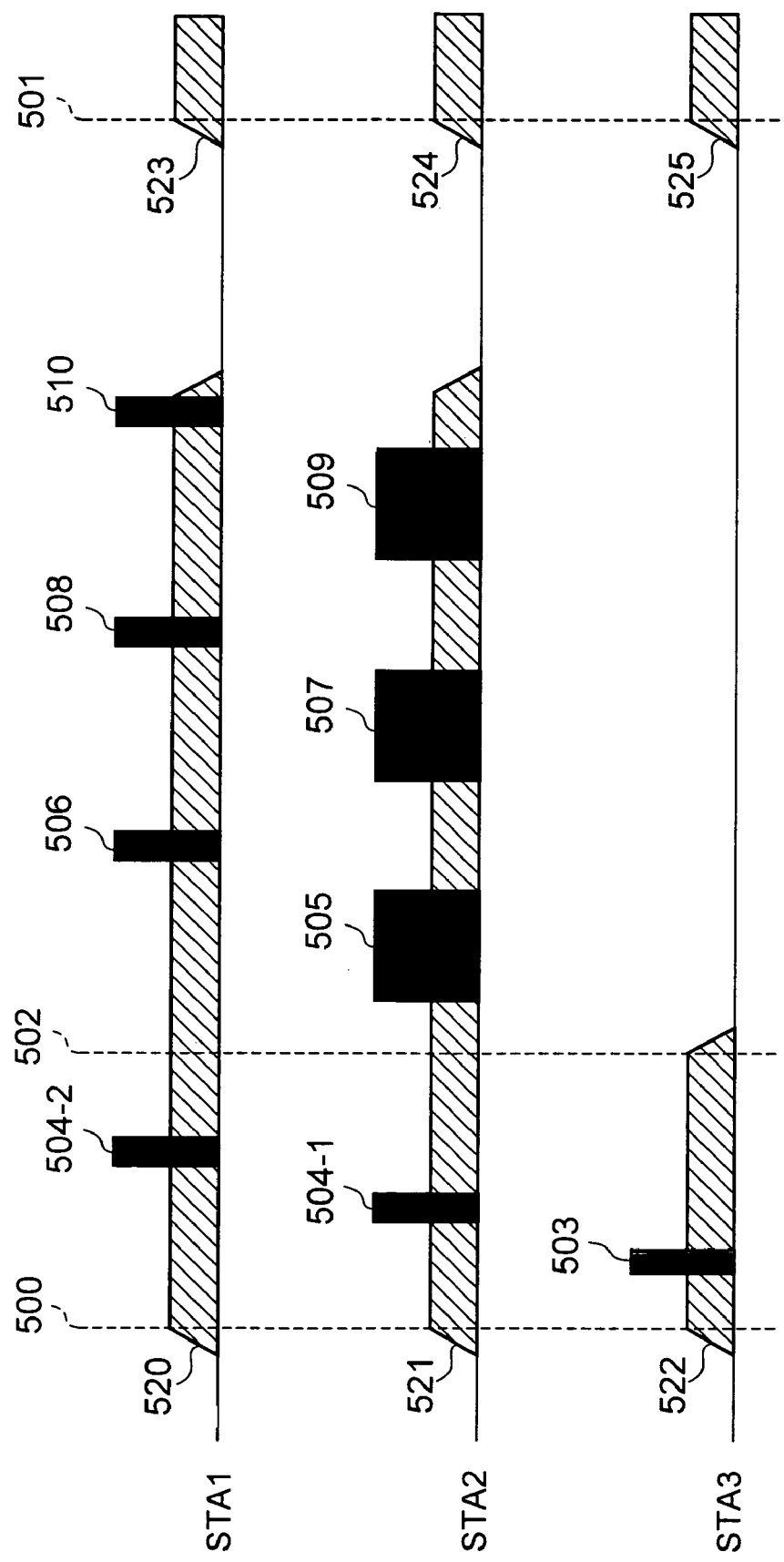
FIG. 12 is a chart showing operation of the wireless terminal in the time frame in which the application data are transmitted and received from a wireless terminal 3 (STA2) to a wireless terminal 2 (STA1)

FIG. 12 is a chart showing the operation of the wireless terminal in the time frame in which the application data are transmitted and received from the wireless terminal 3 (STA2) to the wireless terminal 2 (STA1).

In FIG. 12, reference numerals 500 and 501 indicate the start of the time frame, and reference numeral 502 indicates the end of the data transmission indication period 404 in the time frame started with 500. Reference numerals 520, 521, 522, 523, 524, and 525 indicate the normal power operation periods of the wireless terminals, and it is shown that the remaining portions are in the low power consumption state. An example is shown in FIG. 12, in which the wireless terminal 4 (STA3) transmits the beacon in the time frame started with 500.

At the start time 500 of the time frame, all the wireless terminals 2 (STA1), 3 (STA2), and 4 (STA3) shift to the normal power state from the low power consumption state. After transmitting a beacon 503 of the wireless terminal 4 (STA3), the wireless terminal 3 (STA2) transmits the data transmission indication frame 504-1 to the wireless terminal 2 (STA1). Accordingly, the wireless terminal 2 (STA1) transmits a reception response frame 504-2 to the wireless terminal 3 (STA2).

Thus, an element for the wireless terminals 3 (STA2) is created in the transmission indication frame sender address list 202 (FIG. 2) of the wireless terminal 2 (STA1), the address of the wireless terminal 3 (STA2) is recorded in the transmission indication frame sender address 301 (FIG. 3), and information indicating validity is recorded in the corresponding validation information 302 (FIG. 3). Further, an element for the wireless terminal 2 (STA1) is created in the transmission indication frame destination address list 203 (FIG. 2) of the wireless terminal 3 (STA2), an address of the wireless terminal 2 (STA1) is recorded in the transmission indication frame destination address 303 (FIG. 4), and information indicating validity is recorded in the corresponding validation information 304 (FIG. 4).

After the end 502 of the data transmission indication period 404, since the transmission indication frame sender address list 202 of the wireless terminal 2 (STA1) and the transmission indication frame destination address list 203 of the wireless terminal 3 (STA2) have valid elements, the normal power state is held, and thus the wireless terminal 4 (STA3) shifts to the low power consumption state. In the subsequent data transmission period 405, data are transmitted from the wireless terminal 2 (STA1) to the wireless terminal 3 (STA2).

The example of FIG. 12 shows the way in which three data frames 505, 507, and 509 are transmitted and respective reception response frames 506, 508, and 510 are transmitted. The data frames 505 and 507 are transmitted by setting the MDF 412 to 1. Thus, the validities of the elements of the transmission indication frame sender address list 202 of the wireless terminal 2 (STA1) and the transmission indication frame destination address list 203 of the wireless terminal 3 (STA2) are maintained.

The data frame 509 is transmitted by setting the MDF 412 to 0. In the stage where the corresponding reception acknowledge frame 510 is received by the wireless terminal 3 (STA2), invalid information is written into the validation information 302 (FIG. 3) of the element for the wireless terminal 3 (STA2) in the transmission indication frame sender address list 202 (FIG. 2) of the wireless terminal 2 (STA1), and the validation information 304 (FIG. 4) of the element for the wireless terminal 2 (STA1) in the transmission indication frame destination address list 203 (FIG. 2) of the wireless terminal 3 (STA2). At this stage, the wireless terminal 2 (STA1) and the wireless terminal 3 (STA2) do not have the transmission indication frame sender address list 202 and the transmission indication frame destination address list 203 which have a valid element, and therefore they shift to the low power consumption state.

Figure 13:
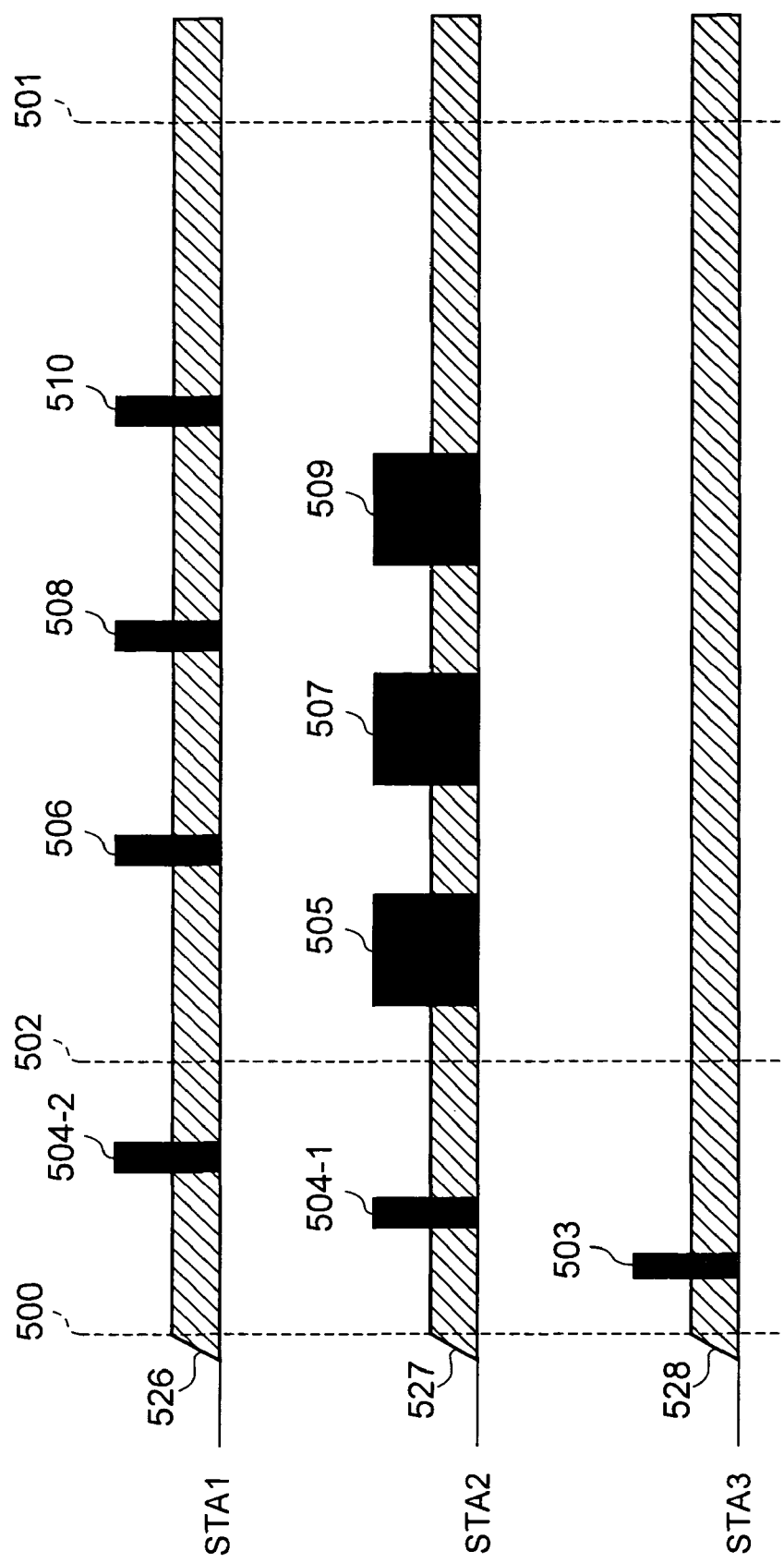
FIG. 13 is a chart showing the frame transmission in the ad hoc network operating in the normal power management mode in the same state as that of FIG. 12 and changes of the power state.

FIG. 13 is a chart showing the frame transmission in the ad hoc network operating in the normal power management mode in the same state as that of FIG. 12, and changes of the power state. FIG. 13 differs from FIG. 12 only in the power states 526, 527, and 528 of the wireless terminals 2 (STA1), 3 (STA2), and 4 (STA3). The wireless terminal 4 (STA3) is a beacon transmitting terminal, and therefore it holds the normal power state during the time frame. Having exchanged the transmission indication frames (ATIM Frame), the wireless terminal 2 (STA1) and the wireless terminal 3 (STA2) hold the normal power state until the start (TBTT) of the next time frame. As can be seen from FIGS. 12 and 13, the power consumption is smaller in the independent power management mode as compared with that in the normal power management mode.

Figure 14:
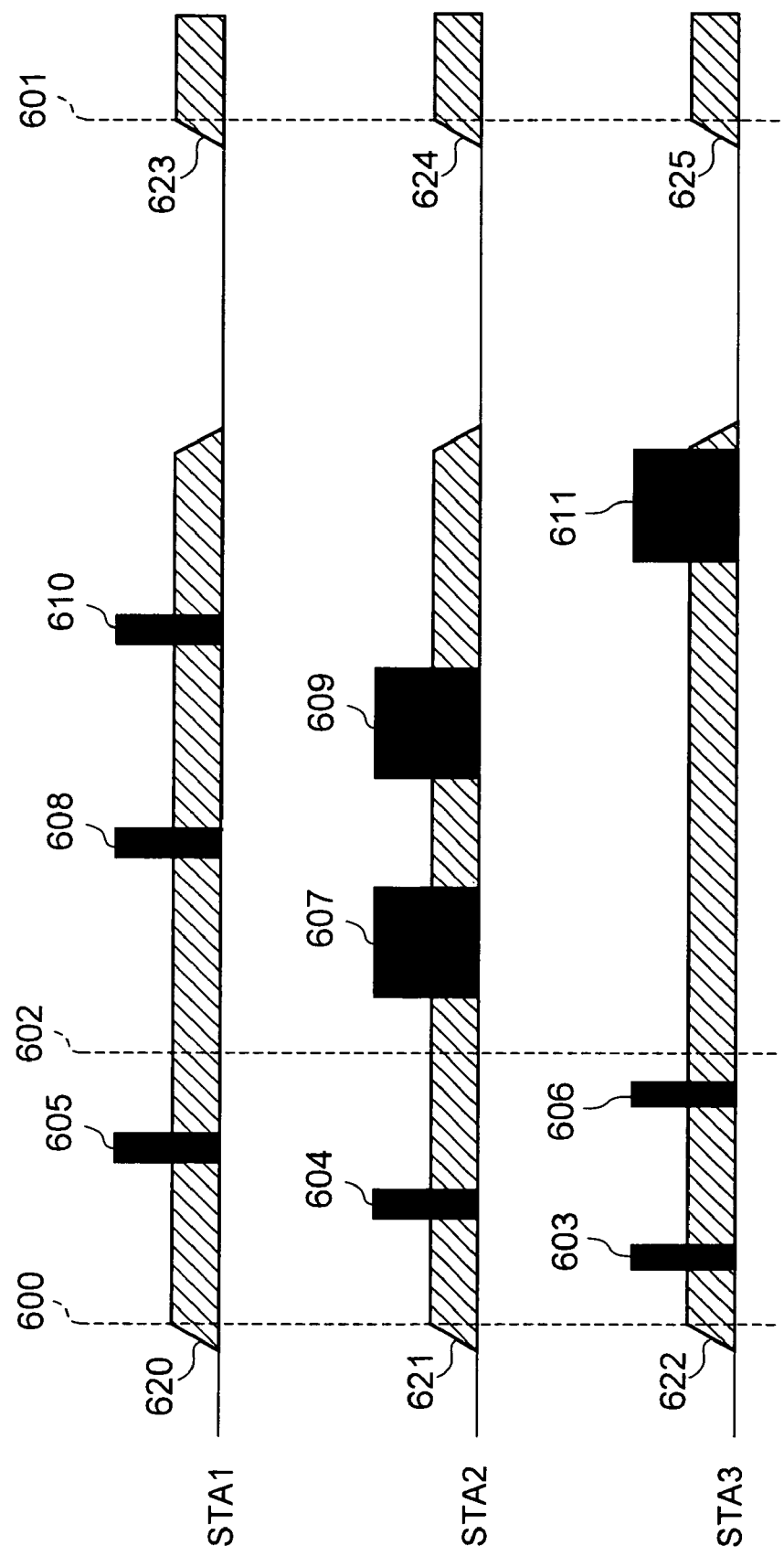
FIG. 14 is a chart showing operation of the wireless terminal in the time frame in which the application data are transmitted and received from the wireless terminal 3 (STA2) to the wireless terminal 2 (STA1) and multicast data including the wireless terminal 2 (STA1) and the wireless terminal 3 (STA2) as addresses are transmitted from the wireless terminal 4 (STA3)

FIG. 14 is a chart showing the operation of the wireless terminal in the time frame in which the application data are transmitted and received from the wireless terminal 3 (STA2) to the wireless terminal 2 (STA1), and multicast data including the wireless terminal 2 (STA1) and the wireless terminal 3 (STA2) as addresses are transmitted from the wireless terminal 4 (STA3). In FIG. 14, reference numerals 600 and 601 indicate the start of the time frames and reference numeral 602 indicates the end of the data transmission indication period in the time frame started with 600. Reference numerals 620, 621, 622, 623, 624, and 625 indicate the normal power operation period of the wireless terminals, and it is shown that the remaining portions are in the low power consumption state. An example is shown in FIG. 14, in which the wireless terminal 4 (STA3) transmits the beacon in the time frame started with 600.

At the start time 600 of the time frame, all the wireless terminals 2 (STA1), 3 (STA2), and 4 (STA3) shift to the normal power state from the low power consumption state. After transmitting a beacon 603 of the wireless terminal 4 (STA3), the wireless terminal 3 (STA2) transmits the data transmission indication frame 604 to the wireless terminal 2 (STA1). Accordingly, the wireless terminal 2 (STA1) transmits the reception response frame 605 to the wireless terminal 3 (STA2). Subsequent to this, the wireless terminal 4 (STA3) transmits the data transmission indication frame 606 to multicast addresses which include the wireless terminal 2 (STA1) and the wireless terminal 3 (STA2) as addresses. Thus, an element for the wireless terminal 3 (STA2) and an element for the wireless terminals 4 (STA3) are created in the transmission indication frame sender address list 202 (FIG. 2) of the wireless terminal (STA1), the addresses of the wireless terminal 3 (STA2) and the wireless terminal 4 (STA3) are recorded in the transmission indication frame sender address 301 (FIG. 3) of each element, and information indicating validity is recorded in the corresponding validation information 302 (FIG. 3).

Further, an element for the wireless terminal 2 (STA1) is created in the transmission indication frame destination address list 203 (FIG. 2) of the wireless terminal 3 (STA2), the address of the wireless terminal 2 (STA1) is recorded in the transmission indication frame destination address 303 (FIG. 4), information indicating validity is recorded in the corresponding validation information 304 (FIG. 4), an element for the wireless terminals 4 (STA3) is created in the transmission indication frame sender address list 202 (FIG. 2), an address of the wireless terminal 4 (STA3) is recorded in the transmission indication frame sender address 301 (FIG. 3) of the element, and information indicating validity is recorded in the corresponding validation information 302 (FIG. 3). Further, an element for the destination address of the multicast transmission indication frame is created in the transmission indication frame destination address list 203 (FIG. 2) of the wireless terminal 4 (STA3), the address is recorded in the transmission indication frame destination address 303 (FIG. 4), and information indicating validity is recorded in the corresponding validation information 304 (FIG. 4).

After the end 502 of the data transmission indication period 404, the wireless terminals 2 (STA1), 3 (STA2), and 4 (STA3) have valid elements in the transmission indication frame sender address list 202 or the transmission indication frame destination address list 203, and therefore they hold the normal power state. In the subsequent data transmission period 405, data are transmitted from the wireless terminal (STA1) to the wireless terminal 3 (STA2), and multicast data transmission from the wireless terminal 4 (STA3) is carried out.

The example of FIG. 14 shows the way in which two unicast data frames 607 and 609 are transmitted, the way in which respective reception response frames 608 and 610 are transmitted, and the way in which one multicast data frame 611 is transmitted from the wireless terminal 4 (STA3). The data frame 607 is transmitted by setting the MDF 412 to 1. The data frames 609 and 611 are transmitted by setting the MDF to 0.

At the stage in which the reception acknowledge frame (ACK frame) 610 corresponding to a data frame 609 is received by the wireless terminal 3 (STA2), the element for the wireless terminal 3 (STA2) of transmission indication frame sender address list 202 (FIG. 2) of the wireless terminal 2 (STA1), and the element for the wireless terminal 2 (STA1) of the transmission indication frame destination address list 203 (FIG. 2) of the wireless terminal 3 (STA2) are invalidated. However, the normal power consumption state is held, because each element for the wireless terminal 4 (STA3) of the transmission indication frame sender address list 202 is maintained valid. When the data frame 611 is transmitted, the elements for the destination addresses of the multicast transmission indication frame of the transmission indication frame destination address list 203 of the wireless terminal 4 (STA3), and the elements for the wireless terminal 4 (STA3) of the transmission indication frame sender address list 202 of the wireless terminal 2 (STA1) and the wireless terminal 3 (STA2) are invalidated. At this stage, the wireless terminal 2 (STA1), the wireless terminal 3 (STA2), and the wireless terminal 4 (STA3) do not have the transmission indication frame sender address list 202 and the transmission indication frame destination address list 203 which have an valid element, and therefore they shift to the low power consumption state.

FIG. 15 is a chart showing the frame transmission in the ad hoc network operating in the normal power management mode in the same state as FIG. 14, and changes of the power state. FIG. 15 differs from FIG. 14 only in the power states 626, 627, and 628 of the wireless terminals 2 (STA1), 3 (STA2), and 4 (STA3). Having exchanged the transmission indication frames (ATIM Frame), the wireless terminals 2 (STA1), 3 (STA2), and 4 (STA3) hold the normal power state until the start (TBTT) of the subsequent time frame. In the independent power management mode, the power consumption is smaller as compared with that in the normal power management mode.

As described above, according to the present embodiment, the wireless terminals 2-4 that connect to the wireless network 5 where communications are carried out by means of the time frames, which include the data transmission indication period and the subsequent data transmission period and which are periodically repeated at predetermined time intervals, have the low power consumption state and the normal power state as operating states and an operation switching function for switching between the states by themselves. The wireless terminal has the normal power mode and the low power consumption mode as power management modes. In the normal power mode, the wireless terminal operates in the normal power state. In the low power consumption mode, the wireless terminal operates in the normal power state during the data transmission indication period, and operates in the low power consumption state during the data transmission period.

Further, after transmitting the beacon and before the data transmission indication period 404 ends, the sender wireless terminal obtains the transmission rights with respect to the wireless medium, and transmits the transmission indication frame to the destination wireless terminal. The destination wireless terminal which receives the unicast transmission indication frame among the transmission indication frames, sends back the reception response frame to the sender wireless terminal. The destination wireless terminal which carries out multicast transmission indication frame reception does not send back the reception response frame.

The destination wireless terminal holds therein the sender address of the unicast transmission indication frame which sends back the reception response frame, the sender address of the multicast transmission indication frame, and the transmission indication frame sender address list 202 which is a list showing their validities. The sender wireless terminal holds therein the destination address of the unicast transmission indication frame which receives the transmission response frame, the destination address of the multicast transmission indication frame, and the transmission indication frame destination address list 203 which is a list showing their validities. The wireless terminal can be both the sender wireless terminal and the destination wireless terminal.

Further, during the data transmission period 405, only the destination wireless terminal which transmits the reception response frame to the unicast transmission indication frame, the destination wireless terminal which receives the multicast transmission indication frame, the sender wireless terminal which transmits the unicast transmission indication frame and receives the corresponding reception response frame, the sender wireless terminal which transmits the multicast transmission indication frame, and the wireless terminal in the normal power mode operate in the normal power state. The rest of the wireless terminals operate in the low power consumption state.

Therefore, according to the present embodiments, the following advantageous effects are achieved as compared with a conventional ad hoc network. The power consumption for maintaining the ad hoc network is reduced in a situation where data communications are not performed between the terminals. The power consumption used by the whole data communications may be reduced in a situation where data communications are carried out among the terminals.

In addition, a computer-readable program of instructions for executing the above processing in a computer may be recorded on a floppy disk, a hard disk, an optical disk, semiconductor memory, etc., and may be read out for installation and executed in a terminal unit.

The present invention contains subject matter related to Japanese Patent Application JP 2005-122434 filed in the Japanese Patent Office on Apr. 20, 2005, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus configured to perform wireless communications with a counterpart apparatus by use of a data frame including a data transmission indication period and a data transmission period following the indication period, the apparatus comprising:
   a processing unit configured to perform power management of the wireless communication apparatus; and
   an operation switching function for switching between operating states of the wireless communication apparatus; wherein
   a normal power state and a low power consumption state are set as the operating states;
   a normal power mode and a low power consumption mode are set as power management modes; and
   the processing unit performs the power management such that the wireless communication apparatus is operated in one of the following manners:
      (1) the normal power state in the normal power mode;
      (2) the normal power state during the data transmission indication period in the low power consumption mode; and
      (3) the low power consumption state during the data transmission period in the low power consumption mode; and wherein
   in a case where data that is to be transmitted to a wireless communication apparatus, which operates in the low power consumption mode, is held and there is a wireless communication apparatus which requests a transmission of the data during the data frame period, the wireless communication apparatus functions as a destination wireless terminal if the apparatus is a destination of the data and a sender wireless terminal if the apparatus is a sender of the data;
   in a case where the wireless communication apparatus functions as the sender wireless terminal, the sender wireless terminal acquires a transmission right with respect to a wireless medium before an end of the data transmission indication period after a beacon transmission, and transmits a transmission indication frame to the destination wireless terminal;
   in a case where the wireless communication apparatus functions as the destination wireless terminal, the destination wireless terminal sends back a reception response frame to the sender wireless terminal if the destination wireless terminal received a unicast transmission indication frame among the transmission indication frames, and no reception response frame is sent back if the destination wireless terminal received a multicast transmission indication frame;
   in a case where the wireless communication apparatus functions as the destination wireless terminal, the destination wireless terminal holds therein a transmission indication frame sender address list, the list showing a sender address of the unicast transmission indication frame which sends back the reception response frame, a sender address of the multicast transmission indication frame, and validities thereof; and
   in a case where the wireless communication apparatus functions as the sender wireless terminal, the sender wireless terminal holds therein a transmission indication frame destination address list, the list showing a destination address of the unicast transmission indication frame, a destination address of the multicast transmission indication frame which receives the returned transmission response frame, and validities thereof, and
   the wireless communication apparatus is capable of functioning as both the sender wireless terminal and the destination wireless terminal.

2. The wireless communication apparatus according to claim 1, further comprising:
   a frame transmission processing unit and a reception processing unit; wherein
   in the normal power state, the processing unit performs power management of the transmission processing unit and the reception processing unit such that frame transmission and reception operations can be performed;
   in the low power consumption state, the processing unit performs the power management of the transmission processing unit and the reception processing unit such that no frame transmission or reception operation can be performed and less power than that of the normal power state is consumed.

3. The wireless communication apparatus according to claim 1, wherein:
   at the start of the data transmission indication period, the processing unit performs the power management such that the wireless communication apparatus operates in the normal power state regardless of the power management mode and a previous operating state, and transmits the beacon according to a specified transmission procedure.

4. The wireless communication apparatus according to claim 1, wherein
   in the data transmission period, the normal power state is selected for operations of the destination wireless terminal which transmits the reception response frame to the unicast transmission indication frame, the destination wireless terminal which receives the multicast transmission indication frame, the sender wireless terminal which transmits the unicast transmission indication frame and receives the corresponding reception response frame, and the sender wireless terminal which transmits the multicast transmission indication frame, and the low power consumption state is selected for the rest of the wireless terminals.

5. The wireless communication apparatus according to claim 4, wherein:
   a data frame transmitted and received between the wireless terminals includes transmission continuation information, the transmission continuation information indicating whether or not the sender wireless terminal transmits a subsequent data frame to the same destination wireless terminal during the data transmission period;
   the sender wireless terminal transmits a plurality of data frames to the same destination wireless terminal during the data transmission interval such that information indicating that the subsequent data frame is transmitted is set in the transmission continuation information of the data frames among the plurality of data frames except for the last data frame to be transmitted, and information indicating that no subsequent data frame is transmitted is set in the transmission continuation information of the last data frame;
   the sender wireless terminal transmit transmits one data frame to the same destination wireless terminal during the data transmission interval, and information indicating that no subsequent data frame is transmitted is set in the transmission continuation information of the data frame.

6. The wireless communication apparatus according to claim 5, wherein among the wireless terminals in the low power consumption mode, in which the transmission indication frame is transmitted and received and which operate in the normal power state for the data frame transmission and the data frame reception during the data transmission indication period, in a case where the wireless terminal functions as the sender wireless terminal, and the wireless terminal transmits a unicast data frame in which information indicating that no subsequent data frame is transmitted is set in the transmission continuation information to a valid destination address in the transmission indication frame destination address list, receives a corresponding transmission response frame, and transmits a multicast data frame, the destination address included in the transmission indication frame destination address list is invalidated, if all the destination addresses are invalidated, conditions for completing transmission are satisfied; and the wireless terminal operates in the low power consumption state until the start of the next data transmission indication period;

in a case where the wireless terminals functions as the destination wireless terminal, and the unicast data frame is received, in which information indicating that no subsequent data frame is transmitted is set in the transmission continuation information, from a valid sender address listed in the transmission indication frame sender address list, a corresponding transmission response frame is transmitted, and the multicast data frame is received, the sender address included in the transmission indication frame sender address list is invalidated;

if all senders addresses are invalidated, conditions for completing reception are satisfied; and the wireless terminal operates in the low power consumption state until the start of the next data transmission indication period.

7. The wireless communication apparatus according to claim 6, wherein:

in a case where the wireless communication apparatus functions as both the sender wireless terminal and the destination wireless terminal, the wireless communication apparatus operates in the low power consumption state until the start of the next data transmission indication period if the conditions for completing transmission and the conditions for completing reception are satisfied.

8. A wireless network system configured to enable to perform wireless communications between wireless communication apparatuses by use of a data frame including a data transmission indication period and a data transmission period following the indication period, wherein:

each of the wireless communication apparatuses comprises:

a processing unit configured to perform power management of the wireless communication apparatus; and an operation switching function for switching between operating states of the wireless communication apparatus; wherein a normal power state and a low power consumption state are set as the operating states;

a normal power mode and a low power consumption mode are set as power management modes; and the processing unit performs the power management such that the wireless communication apparatus is operated in one of the following manners:

(1) the normal power state in the normal power mode;

(2) the normal power state during the data transmission indication period in the low power consumption mode; and (3) the low power consumption state during the data transmission period in the low power consumption mode; and wherein in a case where data that is to be transmitted to a wireless communication apparatus, which operates in the low power consumption mode, is held and there is a wireless communication apparatus which requests a transmission of the data during the data frame period, the wireless communication apparatus functions as a destination wireless terminal if the apparatus is a destination of the data and a sender wireless terminal if the apparatus is a sender of the data;

the sender wireless terminal acquires a transmission right with respect to a wireless medium before an end of the data transmission indication period after a beacon transmission, and transmits a transmission indication frame to the destination wireless terminal the destination wireless terminal sends back a reception response frame to the sender wireless terminal if the destination wireless terminal received a unicast transmission indication frame among the transmission indication frames, and no reception response frame is sent back if the destination wireless terminal received a multicast transmission indication frame;

the destination wireless terminal holds therein a transmission indication frame sender address list, the list showing a sender address of the unicast transmission indication frame which sends back the reception response frame, a sender address of the multicast transmission indication frame, and validities thereof; and the sender wireless terminal holds therein a transmission indication frame destination address list, the list showing a destination address of the unicast transmission indication frame, a destination address of the multicast transmission indication frame which receives the returned transmission response frame, and validities thereof, and the sender wireless terminal is also capable of functioning as the destination wireless terminal.

9. The wireless network system according to claim 8, wherein:

the wireless communication apparatus further comprises:

a frame transmission processing unit and reception processing unit; wherein in the normal power state, the processing unit performs power management of the transmission processing unit and the reception processing unit such that frame transmission and reception operations can be performed;

in the low power consumption state, the processing unit performs the power management of the transmission processing unit and the reception processing unit such that no frame transmission nor reception operation can be performed and less power than that of the normal power state is consumed.

10. The wireless network system according to claim 8, wherein:

at the start of the data transmission indication period, the processing unit performs the power management such that the wireless communication apparatus operates in the normal power state regardless of the power management mode and a previous operating state, and transmits the beacon according to a specified transmission procedure.

11. The wireless network system according to claim 8, wherein:

in the data transmission period, the normal power state is selected for operations of the destination wireless terminal which transmits the reception response frame to the unicast transmission indication frame, the destination wireless terminal which receives the multicast transmission indication frame, the sender wireless terminal which transmits the unicast transmission indication frame and receives the corresponding reception response frame, and the sender wireless terminal which transmits the multicast transmission indication frame, and the low power consumption state is selected for the rest of the wireless terminals.

12. The wireless network system according to claim 11, wherein:

a data frame transmitted and received between the wireless terminals include transmission continuation information, the transmission continuation information indicating whether or not the sender wireless terminal transmits a subsequent data frame to the same destination wireless terminal during the data transmission period;

the sender wireless terminal transmits a plurality of data frames to the same destination wireless terminal during the data transmission interval such that information indicating that the subsequent data frame is transmitted is set in the transmission continuation information of the data frames among the plurality of data frames except for the last data frame to be transmitted, and information indicating that no subsequent data frame is transmitted is set in the transmission continuation information of the last data frame;

the sender wireless terminal transmits one data frame to the same destination wireless terminal during the data transmission interval, and information indicating that no subsequent data frame is transmitted is set in the transmission continuation information of the data frame.

13. The wireless network system according to claim 12, wherein:

among the wireless terminals in the low power consumption mode, in which the transmission indication frame is transmitted and received and which operate in the normal power state for the data frame transmission and the data frame reception during the data transmission indication period, in a case where the wireless terminal functions as the sender wireless terminal, and the wireless terminal transmits a unicast data frame in which information indicating that no subsequent data frame is transmitted is set in the transmission continuation information to a valid destination address in the transmission indication frame destination address list, receives a corresponding transmission response frame, and transmits a multicast data frame, the destination address included in the transmission indication frame destination address list is invalidated, if all the destination addresses are invalidated, the conditions for completing transmission are satisfied; and the wireless terminal operates in the low power consumption state until the start of the next data transmission indication period;

in a case where the wireless terminals functions as the destination wireless terminal, and the unicast data frame is received, in which information indicating that no subsequent data frame is transmitted is set in the transmission continuation information, from a valid sender address listed in the transmission indication frame sender address list, a corresponding transmission response frame is transmitted, and the multicast data frame is received, the sender address included in the transmission indication frame sender address list is invalidated;

if all sender address is invalidated, the conditions for completing reception are satisfied; and the wireless terminal operates in the low power consumption state until the start of the next data transmission indication period.

14. The wireless network system according to claim 13, wherein:

in a case where the wireless communication apparatus functions as both the sender wireless terminal and the destination wireless terminal, the wireless communication apparatus operates in the low power consumption state until the start of the next data transmission indication period if the conditions for completing transmission and the conditions for completing reception are satisfied.

15. The wireless network system according to claim 13, wherein:

the multicast is performed in a case of sending to all the wireless communication apparatuses in the wireless network and a case of sending to selected wireless communication apparatuses in the wireless network.

16. A communication method for a wireless communication apparatus configured to perform wireless communications with a counterpart apparatus by use of a data frame including a data transmission indication period and a data transmission period following the indication period, the method comprising:

setting a normal power state and a low power consumption state as operating states;

setting a normal power mode and a low power consumption mode as power management modes;

at the normal power mode, operating the wireless communication apparatus in a normal power state; and performing the power management such that the wireless communication apparatus is operated in one of the following manners:

(1) the normal power state in the normal power mode;

(2) the normal power state during the data transmission indication period in the low power consumption mode; and (3) the low power consumption state during the data transmission period in the low power consumption mode; wherein in a case where data that is to be transmitted to a wireless communication apparatus, which operates in the low power consumption mode, is held and there is a wireless communication apparatus which requests a transmission of the data during the data frame period, the wireless communication apparatus functions as a destination wireless terminal if the apparatus is a destination of the data and a sender wireless terminal if the apparatus is a sender of the data;

the sender wireless terminal acquires a transmission right with respect to a wireless medium before an end of the data transmission indication period after a beacon transmission, and transmits a transmission indication frame to the destination wireless terminal;

the destination wireless terminal sends back a reception response frame to the sender wireless terminal if the destination wireless terminal received a unicast transmission indication frame among the transmission indication frames, and no reception response frame is sent back if the destination wireless terminal received a multicast transmission indication frame;

the destination wireless terminal holds therein a transmission indication frame sender address list, the list showing a sender address of the unicast transmission indication frame which sends back the reception response frame, a sender address of the multicast transmission indication frame, and validities thereof; and the sender wireless terminal holds therein a transmission indication frame destination address list, the list showing a destination address of the unicast transmission indication frame, a destination address of the multicast transmission indication frame which receives the returned transmission response frame, and validities thereof, and the sender wireless terminal is also capable of functioning as the destination wireless terminal.

17. The method according to claim 16, wherein:

in the data transmission period, the normal power state is selected for operations of the destination wireless terminal which transmits the reception response frame to the unicast transmission indication frame, the destination wireless terminal which receives the multicast transmission indication frame, the sender wireless terminal which transmits the unicast transmission indication frame and receives the corresponding reception response frame, and the sender wireless terminal which transmits the multicast transmission indication frame, and the low power consumption state is selected for the rest of the wireless terminals.

18. The method according to claim 17, wherein:

a data frame transmitted and received between the wireless terminals include transmission continuation information, the transmission continuation information indicating whether or not the sender wireless terminal transmits a subsequent data frame to the same destination wireless terminal during the data transmission period;

the sender wireless terminal transmits a plurality of data frames to the same destination wireless terminal during the data transmission interval such that information indicating that the subsequent data frame is transmitted is set in the transmission continuation information of the data frames among the plurality of data frames except for the last data frame to be transmitted, and information indicating that no subsequent data frame is transmitted is set in the transmission continuation information of the last data frame;

the sender wireless terminal transmits one data frame to the same destination wireless terminal during the data transmission interval, and information indicating that no subsequent data frame is transmitted is set in the transmission continuation information of the data frame.

19. The method according to claim 18, wherein:

among the wireless terminals in the low power consumption mode, in which the transmission indication frame is transmitted and received and which operate in the normal power state for the data frame transmission and the data frame reception during the data transmission indication period, in a case where the wireless terminal functions as the sender wireless terminal, and the wireless terminal transmits a unicast data frame in which information indicating that no subsequent data frame is transmitted is set in the transmission continuation information to a valid destination address in the transmission indication frame destination address list, receives a corresponding transmission response frame, and transmits a multicast data frame, the destination address included in the transmission indication frame destination address list is invalidated, if all the destination addresses are invalidated, the conditions for completing transmission are satisfied; and the wireless terminal operates in the low power consumption state until the start of the next data transmission indication period;

in a case where the wireless terminals functions as the destination wireless terminal, and the unicast data frame is received, in which information indicating that no subsequent data frame is transmitted is set in the transmission continuation information, from a valid sender address listed in the transmission indication frame sender address list, a corresponding transmission response frame is transmitted, and the multicast data frame is received, the sender address included in the transmission indication frame sender address list is invalidated;

if all sender address is invalidated, the conditions for completing reception are satisfied; and the wireless terminal operates in the low power consumption state until the start of the next data transmission indication period.

20. The method according to claim 19, wherein:

in a case where the wireless communication apparatus functions as both the sender wireless terminal and the destination wireless terminal, the wireless communication apparatus operates in the low power consumption state until the start of the next data transmission indication period if the conditions for completing transmission and the conditions for completing reception are satisfied.

21. The method according to claim 19, wherein:

the multicast is performed in a case of sending to all the wireless communication apparatuses in the wireless network and a case of sending to selected wireless communication apparatuses in the wireless network.

22. A computer-readable medium tangibly embodying a program of instructions executable by a computer to perform a communication method for a wireless communication apparatus configured to perform wireless communications with a counterpart apparatus by use of a data frame including a data transmission indication period and a data transmission period following the indication period, the method comprising:

setting a normal power state and a low power consumption state as operating states;

setting a normal power mode and a low power consumption mode as power management modes;

at the normal power mode, operating the wireless communication apparatus in a normal power state; and performing the power management such that the wireless communication apparatus is operated in one of the following manners:

(1) the normal power state in the normal power mode;

(2) the normal power state during the data transmission indication period in the low power consumption mode; and (3) the low power consumption state during the data transmission period in the low power consumption mode; wherein in a case where data that is to be transmitted to a wireless communication apparatus, which operates in the low power consumption mode, is held and there is a wireless communication apparatus which requests a transmission of the data during the data frame period, the wireless communication apparatus functions as a destination wireless terminal if the apparatus is a destination of the data and a sender wireless terminal if the apparatus is a sender of the data;

the sender wireless terminal acquires a transmission right with respect to a wireless medium before an end of the data transmission indication period after a beacon transmission, and transmits a transmission indication frame to the destination wireless terminal;

the destination wireless terminal sends back a reception response frame to the sender wireless terminal if the destination wireless terminal received a unicast transmission indication frame among the transmission indication frames, and no reception response frame is sent back if the destination wireless terminal received a multicast transmission indication frame;

the destination wireless terminal holds therein a transmission indication frame sender address list, the list showing a sender address of the unicast transmission indication frame which sends back the reception response frame, a sender address of the multicast transmission indication frame, and validities thereof; and the sender wireless terminal holds therein a transmission indication frame destination address list, the list showing a destination address of the unicast transmission indication frame, a destination address of the multicast transmission indication frame which receives the returned transmission response frame, and validities thereof, and the sender wireless terminal is also capable of functioning as the destination wireless terminal.

23. The computer readable medium according to claim 22, wherein:

in the data transmission period, the normal power state is selected for operations of the destination wireless terminal which transmits the reception response frame to the unicast transmission indication frame, the destination wireless terminal which receives the multicast transmission indication frame, the sender wireless terminal which transmits the unicast transmission indication frame and receives the corresponding reception response frame, and the sender wireless terminal which transmits the multicast transmission indication frame, and the low power consumption state is selected for the rest of the wireless terminals.

24. The computer readable medium according to claim 23, wherein:

a data frame transmitted and received between the wireless terminals include transmission continuation information, the transmission continuation information indicating whether or not the sender wireless terminal transmits a subsequent data frame to the same destination wireless terminal during the data transmission period;

the sender wireless terminal transmits a plurality of data frames to the same destination wireless terminal during the data transmission interval such that information indicating that the subsequent data frame is transmitted is set in the transmission continuation information of the data frames among the plurality of data frames except for the last data frame to be transmitted, and information indicating that no subsequent data frame is transmitted is set in the transmission continuation information of the last data frame;

the sender wireless terminal transmits one data frame to the same destination wireless terminal during the data transmission interval, and information indicating that no subsequent data frame is transmitted is set in the transmission continuation information of the data frame.

25. The computer readable medium according to claim 24, wherein:

among the wireless terminals in the low power consumption mode, in which the transmission indication frame is transmitted and received and which operate in the normal power state for the data frame transmission and the data frame reception during the data transmission indication period, in a case where the wireless terminal functions as the sender wireless terminal, and the wireless terminal transmits a unicast data frame in which information indicating that no subsequent data frame is transmitted is set in the transmission continuation information to a valid destination address in the transmission indication frame destination address list, receives a corresponding transmission response frame, and transmits a multicast data frame, the destination address included in the transmission indication frame destination address list is invalidated, if all the destination addresses are invalidated, the conditions for completing transmission are satisfied; and the wireless terminal operates in the low power consumption state until the start of the next data transmission indication period;

in a case where the wireless terminals functions as the destination wireless terminal, and the unicast data frame is received, in which information indicating that no subsequent data frame is transmitted is set in the transmission continuation information, from a valid sender address listed in the transmission indication frame sender address list, a corresponding transmission response frame is transmitted, and the multicast data frame is received, the sender address included in the transmission indication frame sender address list is invalidated;

if all sender address is invalidated, the conditions for completing reception are satisfied; and the wireless terminal operates in the low power consumption state until the start of the next data transmission indication period.

26. The computer readable medium according to claim 25, wherein:

in a case where the wireless communication apparatus functions as both the sender wireless terminal and the destination wireless terminal, the wireless communication apparatus operates in the low power consumption state until the start of the next data transmission indication period if the conditions for completing transmission and the conditions for completing reception are satisfied.

27. The computer readable medium according to claim 25, wherein:

the multicast is performed in a case of sending to all the wireless communication apparatuses in the wireless network and a case of sending to selected wireless communication apparatuses in the wireless network.

* * * * *